US008065456B2

(12) United States Patent
Zhu et al.

(10) Patent No.: US 8,065,456 B2
(45) Date of Patent: *Nov. 22, 2011

(54) DELEGATING NETWORK PROCESSOR OPERATIONS TO STAR TOPOLOGY SERIAL BUS INTERFACES

(75) Inventors: Julianne Jiang Zhu, Los Gatos, CA (US); David T. Hass, Santa Clara, CA (US)

(73) Assignee: NetLogic Microsystems, Inc., Santa Clara, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 12/019,576

(22) Filed: Jan. 24, 2008

(65) Prior Publication Data

US 2008/0184008 A1     Jul. 31, 2008

Related U.S. Application Data

(63) Continuation of application No. 11/831,887, filed on Jul. 31, 2007, which is a continuation-in-part of application No. 10/930,937, filed on Aug. 31, 2004, which is a continuation-in-part of application No. 10/898,008, filed on Jul. 23, 2004, now Pat. No. 7,334,086, which is a continuation-in-part of application No. 10/682,579, filed on Oct. 8, 2003, now abandoned.

(60) Provisional application No. 60/490,236, filed on Jul. 25, 2003, provisional application No. 60/416,838, filed on Oct. 8, 2002.

(51) Int. Cl.
*G06F 13/42* (2006.01)
*G06F 13/00* (2006.01)
*G06F 13/14* (2006.01)
*G06F 15/76* (2006.01)

(52) U.S. Cl. ........... 710/105; 710/300; 710/305; 712/11
(58) Field of Classification Search ................ 710/2, 22, 710/29, 36, 52, 62, 300, 105, 111, 305–306, 710/308–311, 316; 712/10, 11, 28, 29
See application file for complete search history.

(56) References Cited

U.S. PATENT DOCUMENTS 5,105,188 A     4/1992    Jung et al.
(Continued)

FOREIGN PATENT DOCUMENTS

EP     2174229     2/2009
(Continued)

OTHER PUBLICATIONS

Bursky, Dave. "Scalable Processors Add Fuel To Network Data Rates". Electronic Design. Online May 26, 2005. Retrieved from Internet Sep. 15, 2009. Online ID #10398 <http://electronicdesign.com/Articles/Print.cfm?ArticleID=10398>.*

(Continued)

*Primary Examiner* — Thomas J Cleary
(74) *Attorney, Agent, or Firm* — Vista IP Law Group, LLP

(57) ABSTRACT

An advanced processor comprises a plurality of multi-threaded processor cores configured to support a plurality of software generated read or write instructions for interfacing with a star topology serial bus interface. The multiple-core processor has at least one of an internal fast messaging network or an interface switch interconnect configured to link the processor cores together such that each processor core has a data pathway to each of the other processor cores without going through memory. The fast messaging network or interface switch is also configured to be operably coupled to the star topology serial bus interface. In one aspect of an embodiment of the invention, the fast messaging network connects to a high-bandwidth star-topology serial bus such as a PCI express (PCIe) interface capable of supporting multiple high-bandwidth PCIe lanes.

21 Claims, 24 Drawing Sheets

U.S. PATENT DOCUMENTS

| | | | |
|---|---|---|---|
| 5,179,715 A | 1/1993 | Andoh et al. | |
| 5,369,376 A | 11/1994 | Leblebicioglu | |
| 5,428,781 A | 6/1995 | Duault et al. | |
| 5,574,939 A | 11/1996 | Keckler et al. | |
| 5,867,663 A | 2/1999 | McClure et al. | |
| 5,933,627 A | 8/1999 | Parady | |
| 5,940,872 A | 8/1999 | Hammond et al. | |
| 5,987,492 A | 11/1999 | Yue | |
| 6,018,792 A | 1/2000 | Jeddeloh et al. | |
| 6,032,218 A * | 2/2000 | Lewin et al. | 710/240 |
| 6,049,867 A | 4/2000 | Eickemeyer et al. | |
| 6,067,301 A | 5/2000 | Aatresh | |
| 6,084,856 A | 7/2000 | Simmons et al. | |
| 6,157,955 A | 12/2000 | Narad et al. | |
| 6,182,210 B1 | 1/2001 | Akkary et al. | |
| 6,219,741 B1 | 4/2001 | Pawlowski et al. | |
| 6,233,393 B1 | 5/2001 | Yanagihara et al. | |
| 6,240,152 B1 | 5/2001 | Ho | |
| 6,272,520 B1 | 8/2001 | Sharangpani et al. | |
| 6,275,749 B1 | 8/2001 | Saville et al. | |
| 6,338,095 B1 | 1/2002 | Yasuda et al. | |
| 6,341,337 B1 | 1/2002 | Pong | |
| 6,341,347 B1 | 1/2002 | Joy et al. | |
| 6,370,606 B1 | 4/2002 | Bonola | |
| 6,385,715 B1 | 5/2002 | Merchant et al. | |
| 6,389,468 B1 | 5/2002 | Muller et al. | |
| 6,438,671 B1 | 8/2002 | Doing et al. | |
| 6,452,933 B1 | 9/2002 | Duffield et al. | |
| 6,456,628 B1 | 9/2002 | Greim et al. | |
| 6,507,862 B1 | 1/2003 | Joy et al. | |
| 6,567,839 B1 | 5/2003 | Borkenhagen et al. | |
| 6,574,725 B1 | 6/2003 | Kranich et al. | |
| 6,584,101 B2 | 6/2003 | Hagglund et al. | |
| 6,594,701 B1 | 7/2003 | Forin | |
| 6,618,429 B2 | 9/2003 | Lindsay et al. | |
| 6,629,268 B1 * | 9/2003 | Arimilli et al. | 714/42 |
| 6,651,231 B2 | 11/2003 | Morikawa | |
| 6,665,791 B1 | 12/2003 | Berenbaum et al. | |
| 6,668,308 B2 | 12/2003 | Barroso et al. | |
| 6,687,903 B1 | 2/2004 | Chalmer et al. | |
| 6,694,347 B2 | 2/2004 | Joy et al. | |
| 6,725,334 B2 | 4/2004 | Barroso et al. | |
| 6,745,297 B2 | 6/2004 | Kruckemyer et al. | |
| 6,772,268 B1 | 8/2004 | Kristiansen et al. | |
| 6,794,896 B1 | 9/2004 | Brebner | |
| 6,848,003 B1 | 1/2005 | Arimilli et al. | |
| 6,862,282 B1 | 3/2005 | Oden | |
| 6,876,649 B1 | 4/2005 | Beshai | |
| 6,895,477 B2 | 5/2005 | Hass et al. | |
| 6,901,482 B2 | 5/2005 | Gruner et al. | |
| 6,909,312 B2 | 6/2005 | Mitsumoto | |
| 6,931,641 B1 | 8/2005 | Davis et al. | |
| 6,944,850 B2 | 9/2005 | Hooper et al. | |
| 6,952,749 B2 | 10/2005 | Kim | |
| 6,952,824 B1 | 10/2005 | Hooper et al. | |
| 6,963,921 B1 | 11/2005 | Yang et al. | |
| 6,976,155 B2 | 12/2005 | Drysdale et al. | |
| 6,981,079 B2 | 12/2005 | Dawkins et al. | |
| 7,000,048 B2 | 2/2006 | McAlpine et al. | |
| 7,007,099 B1 | 2/2006 | Donati et al. | |
| 7,020,713 B1 | 3/2006 | Shah et al. | |
| 7,024,519 B2 | 4/2006 | Magoshi | |
| 7,035,998 B1 | 4/2006 | Nemirovsky et al. | |
| 7,058,738 B2 * | 6/2006 | Stufflebeam, Jr. | 710/104 |
| 7,076,545 B2 | 7/2006 | DiMambro et al. | |
| 7,082,519 B2 | 7/2006 | Kelsey et al. | |
| 7,089,341 B2 | 8/2006 | Kriegel | |
| 7,111,162 B2 | 9/2006 | Bagepalli et al. | |
| 7,130,368 B1 | 10/2006 | Aweya et al. | |
| 7,131,125 B2 | 10/2006 | Modelski et al. | |
| 7,134,002 B2 | 11/2006 | Shoemaker | |
| 7,181,742 B2 | 2/2007 | Hooper | |
| 7,190,900 B1 | 3/2007 | Best et al. | |
| 7,209,996 B2 | 4/2007 | Kohn et al. | |
| 7,218,637 B1 | 5/2007 | Best et al. | |
| 7,304,996 B1 | 12/2007 | Swenson et al. | |
| 7,305,492 B2 | 12/2007 | Bryers et al. | |
| 7,334,086 B2 | 2/2008 | Hass et al. | |
| 7,346,757 B2 | 3/2008 | Hass et al. | |
| 7,353,289 B2 | 4/2008 | Visalli et al. | |
| 7,461,213 B2 | 12/2008 | Hass et al. | 711/147 |
| 7,461,215 B2 | 12/2008 | Hass | |
| 7,467,243 B2 | 12/2008 | Rashid et al. | |
| 7,487,379 B2 | 2/2009 | Nguyen et al. | 713/600 |
| 7,509,462 B2 | 3/2009 | Hass et al. | |
| 7,509,476 B2 | 3/2009 | Hass et al. | |
| 7,627,717 B2 | 12/2009 | Hass et al. | 711/119 |
| 7,627,721 B2 | 12/2009 | Hass | |
| 2001/0047468 A1 | 11/2001 | Parady | |
| 2001/0049763 A1 | 12/2001 | Barry et al. | |
| 2002/0010836 A1 | 1/2002 | Barroso et al. | |
| 2002/0013861 A1 | 1/2002 | Adiletta et al. | |
| 2002/0046324 A1 * | 4/2002 | Barroso et al. | 711/122 |
| 2002/0069328 A1 | 6/2002 | Chauvel | |
| 2002/0069345 A1 | 6/2002 | Mohamed et al. | |
| 2002/0078121 A1 | 6/2002 | Ballantyne | |
| 2002/0078122 A1 | 6/2002 | Joy et al. | |
| 2002/0095562 A1 | 7/2002 | Nakanishi et al. | |
| 2002/0147889 A1 | 10/2002 | Krukemyer et al. | |
| 2003/0009626 A1 | 1/2003 | Gruner et al. | |
| 2003/0014607 A1 | 1/2003 | Slavin et al. | |
| 2003/0018856 A1 | 1/2003 | Rowlands | |
| 2003/0028633 A1 | 2/2003 | Lindsay et al. | |
| 2003/0033481 A1 | 2/2003 | Hass et al. | |
| 2003/0033507 A1 | 2/2003 | McGrath | |
| 2003/0037228 A1 | 2/2003 | Kelsey et al. | |
| 2003/0041173 A1 | 2/2003 | Hoyle | |
| 2003/0043803 A1 | 3/2003 | Hooper | |
| 2003/0046464 A1 | 3/2003 | Murty et al. | |
| 2003/0046495 A1 | 3/2003 | Venkitakrishnan et al. | |
| 2003/0046521 A1 | 3/2003 | Shoemaker | |
| 2003/0050954 A1 | 3/2003 | Tayyar et al. | |
| 2003/0056200 A1 | 3/2003 | Li et al. | |
| 2003/0067930 A1 | 4/2003 | Salapura et al. | |
| 2003/0081615 A1 | 5/2003 | Kohn et al. | |
| 2003/0088610 A1 * | 5/2003 | Kohn et al. | 709/107 |
| 2003/0101322 A1 | 5/2003 | Gardner | |
| 2003/0101440 A1 | 5/2003 | Hardin et al. | |
| 2003/0105799 A1 | 6/2003 | Khan et al. | |
| 2003/0110166 A1 | 6/2003 | Wolrich et al. | |
| 2003/0120876 A1 | 6/2003 | Hass et al. | |
| 2003/0128712 A1 | 7/2003 | Moriwaki et al. | |
| 2003/0154352 A1 | 8/2003 | Jamil et al. | |
| 2003/0172257 A1 | 9/2003 | Greenblat et al. | |
| 2003/0195916 A1 | 10/2003 | Putzolu | |
| 2003/0204636 A1 | 10/2003 | Greenblat et al. | |
| 2003/0208521 A1 | 11/2003 | Brenner et al. | |
| 2003/0212830 A1 | 11/2003 | Greenblat et al. | |
| 2003/0217237 A1 | 11/2003 | Benveniste et al. | |
| 2003/0231627 A1 | 12/2003 | John et al. | |
| 2003/0231645 A1 | 12/2003 | Chandra et al. | |
| 2004/0019456 A1 | 1/2004 | Circenis | |
| 2004/0024904 A1 | 2/2004 | DiMambro | |
| 2004/0059984 A1 | 3/2004 | Cavanna et al. | |
| 2004/0098720 A1 | 5/2004 | Hooper | |
| 2004/0100954 A1 | 5/2004 | Dai et al. | |
| 2004/0117554 A1 | 6/2004 | Raghavan | |
| 2004/0128401 A1 | 7/2004 | Fallon et al. | |
| 2004/0128563 A1 | 7/2004 | Kaushik et al. | |
| 2004/0154012 A1 | 8/2004 | Wang et al. | |
| 2004/0216120 A1 | 10/2004 | Burky et al. | |
| 2004/0230752 A1 | 11/2004 | Blake et al. | |
| 2004/0240472 A1 | 12/2004 | Kumar et al. | |
| 2004/0252686 A1 | 12/2004 | Hooper et al. | |
| 2004/0260829 A1 | 12/2004 | Husak et al. | |
| 2005/0027793 A1 | 2/2005 | Hass | 718/105 |
| 2005/0033889 A1 | 2/2005 | Hass et al. | 710/264 |
| 2005/0041651 A1 | 2/2005 | Hass et al. | 370/360 |
| 2005/0041666 A1 | 2/2005 | Hass | 370/394 |
| 2005/0044308 A1 | 2/2005 | Rashid et al. | 370/258 |
| 2005/0044319 A1 | 2/2005 | Olukotun | |
| 2005/0044323 A1 | 2/2005 | Hass | 712/214 |
| 2005/0055503 A1 | 3/2005 | Hass et al. | |
| 2005/0055540 A1 | 3/2005 | Hass et al. | 712/214 |
| 2005/0060462 A1 | 3/2005 | Ota | |
| 2005/0080953 A1 | 4/2005 | Oner et al. | |
| 2005/0088445 A1 * | 4/2005 | Gonzalez et al. | 345/502 |

| | | | |
|---|---|---|---|
| 2005/0105738 | A1 | 5/2005 | Hashimoto |
| 2005/0125582 | A1 | 6/2005 | Tu et al. |
| 2005/0138622 | A1 | 6/2005 | McAlpine et al. |
| 2005/0182887 | A1* | 8/2005 | Sakurai et al. ............... 710/315 |
| 2005/0210229 | A1* | 9/2005 | Sethi et al. ...................... 713/1 |
| 2005/0213585 | A1 | 9/2005 | Sturm et al. |
| 2005/0238022 | A1 | 10/2005 | Panigrahy |
| 2005/0240745 | A1 | 10/2005 | Iyer et al. |
| 2006/0041715 | A1 | 2/2006 | Chrysos et al. |
| 2006/0053424 | A1 | 3/2006 | Koistinen et al. |
| 2006/0095716 | A1* | 5/2006 | Ramesh .......................... 712/24 |
| 2006/0195663 | A1* | 8/2006 | Arndt et al. .................... 711/153 |
| 2006/0200825 | A1 | 9/2006 | Potter |
| 2006/0224659 | A1 | 10/2006 | Yu |
| 2006/0265363 | A1 | 11/2006 | Calvignac et al. |
| 2006/0277369 | A1 | 12/2006 | Tsien et al. |
| 2007/0067533 | A1 | 3/2007 | So et al. |
| 2007/0067778 | A1 | 3/2007 | So et al. |
| 2007/0106827 | A1 | 5/2007 | Boatright et al. |
| 2007/0121626 | A1 | 5/2007 | Shepard |
| 2007/0143514 | A1 | 6/2007 | Kaushik et al. |
| 2007/0157011 | A1* | 7/2007 | Kumar et al. ...................... 713/1 |
| 2007/0162911 | A1 | 7/2007 | Kohn et al. |
| 2007/0204130 | A1 | 8/2007 | Hass et al. |
| 2007/0217453 | A1 | 9/2007 | Rhoades et al. |
| 2007/0266370 | A1 | 11/2007 | Myers et al. |
| 2008/0062927 | A1 | 3/2008 | Zhu et al. ...................... 370/419 |
| 2008/0126709 | A1 | 5/2008 | Hass et al. |
| 2008/0140956 | A1 | 6/2008 | Hass et al. |
| 2008/0168255 | A1* | 7/2008 | Abou-Emara et al. ........... 712/28 |
| 2008/0184008 | A1 | 7/2008 | Zhu et al. |
| 2008/0209186 | A1 | 8/2008 | Boden et al. |
| 2008/0216074 | A1 | 9/2008 | Hass et al. .................... 711/207 |
| 2009/0055496 | A1 | 2/2009 | Garg et al. .................... 709/202 |
| 2009/0182989 | A1 | 7/2009 | Rosenbluth et al. |
| 2009/0201935 | A1 | 8/2009 | Hass et al. ............... 370/395.32 |
| 2010/0042785 | A1 | 2/2010 | Hass et al. .................... 711/119 |
| 2010/0077150 | A1 | 3/2010 | Hass ............................ 711/130 |

FOREIGN PATENT DOCUMENTS

| | | |
|---|---|---|
| WO | WO-03036482 | 5/2003 |
| WO | WO-2005013061 | 2/2005 |
| WO | WO 2009017668 | 2/2009 |
| WO | WO 2009099573 | 8/2009 |

OTHER PUBLICATIONS

"PCI Express Base Specification". Revision 1.0. Apr. 29, 2002. PCI-SIG. pp. 1, 17, and 27-42.*

"IEEE 100-The Authoritative Dictionary of IEEE Standards Terms", Seventh Edition, IEEE Press, 2000, pp. 716.

"Microsoft Computer Dictionary", Fifth Edition, Microsoft Press, 2002, pp. 505.

Burns et al.; Area and System Clock Effects on SMT/CMP Processors; 2001.

Chakraborty: "System-Level Timing Analysis and Scheduling for Embedded Packet Processors". Ph.D Thesis, Computer Engineering and Networks Laboratory, ETH Zurich, Swiwtzerland, Apr. 2003, Pertinent pp. 1, 3-6, 15-30, 41-56, 66-67.

Fiske et al.: "Thread Prioritization: A Thread Scheduling Mechanism for Multiple-Context Parallel Processors". Appears in: Proceedings of the First International Symposium on HPCA, Jan. 1995, Pertinent pp. 1-6.

Goyal et al.: "Start-time Fair Queuing: A Scheduling Algorithm for Integrated Services Packet Switching Networks", In Proc. ACM SIGCOMM'96, Aug. 1996, pp. 157-168.

Hennessy et al. "Computer Architecture: A Quantitative Approach", Third Edition (The Morgan Kaufmann Series in Computer Architecture and Design), May 15, 2002, pp. 608-609 and cover.

Hennessy et al.; "Computer Architecture: A Quantitative Approprach"; 2nd Edition; sections 1.2, 5.1-5.3, and 8.1.

Hennessy et al.; "Computer Architecture: A Quantitative Approprach"; Morgan Kaufmann Publishers, Inc., pp. 654-662, 1996.

Laudon et al.: Interleaving: A multithreading Technique Targeting Multiprocessors and Workstations. In Proc.of the 6th ASPLOS-VI, pp. 308-318, San Jose, CA, Oct. 1994.

Oplinger et al.; Enhancing Software Reliability with Speculative Threads; 2002; ACM.

Pappu et al.: "Scheduling Processing Resources in Programmable Routers". INFOCOM 2002. Twenty-First Annual Joint Conference of the IEEE Computer and Communications Societies. Proceedings. IEEE vol. 1, 23-27, Jun. 2002, Pertinent pp. 1-5.

Rosen et al.: RFC 3031, Multiprotocol Label Switching Architecture, Jan. 2001.

Suijkerbuijk et al.: "Performance Evaluation of Interleaved Multithreading in a VLIW Architecture", Proc. ProRISC, Nov. 2004.

Wolf et al.: "Locality-Aware Predictive Scheduling of Network Processors". Performance Analysis of Systems and Software, 2001. ISPASS. 2001 IEEE International Symposium on Nov. 4-6, 2001, Pertinent pp. 1-4.

Lingerer et al.: "Multithreaded Processors", The Computer Journal, vol. 45, No. 3, 2002.

Zahran et al.; Return-Address Prediction in Speculative Multithreaded Environment; HiPC 2002.

Alpha 21264 Microprocessor Product Brief; Sep. 9, 1998; Digital Equipment Corporation; Preliminary Edition; p. 1; http://ftp.digital.com/pub/digital/info/semiconductor/literature/21264pb.pdf.

U.S. Appl. No. 10/930,938, filed Aug. 31, 2004.
U.S. Appl. No. 10/930,187, filed Aug. 31, 2004.
U.S. Appl. No. 10/930,179, filed Aug. 31, 2004.
U.S. Appl. No. 10/930,186, filed Aug. 31, 2004.
U.S. Appl. No. 10/930,939, filed Aug. 31, 2004.
U.S. Appl. No. 10/930,937, filed Aug. 31, 2004.
U.S. Appl. No. 10/930,456, filed Aug. 31, 2004.
U.S. Appl. No. 10/931,014, filed Aug. 31, 2004.
U.S. Appl. No. 10/930,175, filed Aug. 31, 2004.
U.S. Appl. No. 10/931,003, filed Aug. 31, 2004.
U.S. Appl. No. 10/930,455, filed Aug. 31, 2004.
U.S. Appl. No. 60/490,236, filed Jul. 25, 2003.
U.S. Appl. No. 60/416,838, filed Oct. 8, 2002.
U.S. Appl. No. 10/682,579, filed Aug. 30, 2005.
Non-Final Office Action dated Aug. 30, 2005 for U.S. Appl. No. 10/682,579.
Written Opinion for PCT/US04/23871 dated Oct. 4, 2005.
Non-Final Office Action dated May 1, 2007 for U.S. Appl. No. 10/898,008.
Non-Final Office Action dated Aug. 31, 2005 for U.S. Appl. No. 10/898,008.
Final Office Action dated Apr. 26, 2006 for U.S. Appl. No. 10/898,008.
Notice of Allowance dated Nov. 1, 2007 for U.S. Appl. No. 10/898,008.
Advisory Action dated Jan. 23, 2007 for U.S. Appl. No. 10/898,008.
Non-Final Office Action dated Aug. 5, 2009 for U.S. Appl. No. 10/898,007.
Non-Final Office Action dated Jul. 22, 2008 for U.S. Appl. No. 10/898,007.
Non-Final Office Action dated Jul. 21, 2006 for U.S. Appl. No. 10/898,007.
Final Office Action dated Jan. 20, 2010 for U.S. Appl. No. 10/898,007.
Final Office Action dated Jan. 5, 2009 for U.S. Appl. No. 10/898,007.
Final Office Action dated Sep. 5, 2007 for U.S. Appl. No. 10/898,007.
Advisory Action dated Mar. 23, 2009 for U.S. Appl. No. 10/898,007.
Non-Final Office Action dated Dec. 6, 2006 for U.S. Appl. No. 10/898,150.
Non-Final Office Action dated Oct. 20, 2005 for U.S. Appl. No. 10/898,150.
Final Office Action dated May 25, 2007 for U.S. Appl. No. 10/898,150.
Final Office Action dated Mar. 31, 2006 for U.S. Appl. No. 10/898,150.
Notice of Allowance dated Nov. 1, 2007 for U.S. Appl. No. 10/898,150.
Notice of Allowance dated Aug. 12, 2009 for U.S. Appl. No. 10/897,577.
Non-Final Office Action dated Mar. 18, 2009 for U.S. Appl. No. 10/897,577.

Non-Final Office Action dated Jan. 28, 2008 for U.S. Appl. No. 10/897,577.
Non-Final Office Action dated Jul. 16, 2007 for U.S. Appl. No. 10/897,577.
Non-Final Office Action dated Oct. 3, 2005 for U.S. Appl. No. 10/897,577.
Final Office Action dated Jul. 18, 2008 for U.S. Appl. No. 10/897,577.
Final Office Action dated Apr. 25, 2006 for U.S. Appl. No. 10/897,577.
Advisory Action dated Dec. 31, 2008 for U.S. Appl. No. 10/897,577.
Advisory Action dated Oct. 25, 2006 for U.S. Appl. No. 10/897,577.
Notice of Allowance dated Sep. 3, 2008 for U.S. Appl. No. 11/704,709.
Notice of Allowance dated Feb. 14, 2008 for U.S. Appl. No. 11/704,709.
Non-Final Office Action dated Nov. 1, 2007 for U.S. Appl. No. 11/704,709.
Non-Final Office Action dated Feb. 25, 2009 for U.S. Appl. No. 10/930,938.
Non-Final Office Action dated Aug. 31, 2007 for U.S. Appl. No. 10/930,938.
Non-Final Office Action dated Jun. 29, 2006 for U.S. Appl. No. 10/930,938.
Final Office Action dated Dec. 23, 2009 for U.S. Appl. No. 10/930,938.
Final Office Action dated Sep. 3, 2008 for U.S. Appl. No. 10/930,938.
Final Office Action dated Feb. 2, 2007 for U.S. Appl. No. 10/930,938.
Non-Final Office Action dated Feb. 19, 2010 for U.S. Appl. No. 10/930,455.
Non-Final Office Action dated Mar. 16, 2009 for U.S. Appl. No. 10/930,455.
Non-Final Office Action dated Mar. 13, 2008 for U.S. Appl. No. 10/930,455.
Final Office Action dated Oct. 16, 2009 for U.S. Appl. No. 10/930,455.
Final Office Action dated Oct. 3, 2008 for U.S. Appl. No. 10/930,455.
Advisory Action dated Dec. 26, 2008 for U.S. Appl. No. 10/930,455.
Non-Final Office Action dated Feb. 19, 2010 for U.S. Appl. No. 10/931,003.
Non-Final Office Action dated Jan. 23, 2009 for U.S. Appl. No. 10/931,003.
Non-Final Office Action dated Jan. 24, 2008 for U.S. Appl. No. 10/931,003.
Non-Final Office Action dated Jul. 5, 2007 for U.S. Appl. No. 10/931,003.
Final Office Action dated Aug. 6, 2009 for U.S. Appl. No. 10/931,003.
Final Office Action dated Jul. 24, 2008 for U.S. Appl. No. 10/931,003.
Advisory Action dated Oct. 19, 2009 for U.S. Appl. No. 10/931,003.
Non-Final Office Action dated May 6, 2008 for U.S. Appl. No. 10/930,939.
Final Office Action dated Nov. 26, 2008 for U.S. Appl. No. 10/930,939.
Advisory Action dated Feb. 25, 2009 for U.S. Appl. No. 10/930,939.
Non-Final Office Action dated Jul. 17, 2007 for U.S. Appl. No. 10/930,186.
Final Office Action dated Jan. 9, 2008 for U.S. Appl. No. 10/930,186.
Notice of Allowance dated Aug. 11, 2008 for U.S. Appl. No. 10/930,186.
Non-Final Office Action dated Mar. 30, 2009 for U.S. Appl. No. 10/930,937.
Non-Final Office Action dated Apr. 30, 2008 for U.S. Appl. No. 10/930,937.
Non-Final Office Action dated Mar. 31, 2010 for U.S. Appl. No. 10/930,937.
Final Office Action dated Nov. 24, 2009 for U.S. Appl. No. 10/930,937.
Final Office Action dated Nov. 25, 2008 for U.S. Appl. No. 10/930,937.
Advisory Action dated Feb. 9, 2009 for U.S. Appl. No. 10/930,937.
Non-Final Office Action dated Apr. 13, 2009 for U.S. Appl. No. 10/931,014.
Non-Final Office Action dated May 13, 2008 for U.S. Appl. No. 10/931,014.
Final Office Action dated Nov. 2, 2009 for U.S. Appl. No. 10/931,014.
Final Office Action dated Nov. 24, 2008 for U.S. Appl. No. 10/931,014.
Advisory Action dated Feb. 6, 2009 for U.S. Appl. No. 10/931,014.
Non-Final Office Action dated Jan. 28, 2008 for U.S. Appl. No. 10/897,576.
Non-Final Office Action dated Jan. 4, 2007 for U.S. Appl. No. 10/897,576.
Non-Final Office Action dated Oct. 3, 2005 for U.S. Appl. No. 10/897,576.
Final Office Action dated Aug. 22, 2007 for U.S. Appl. No. 10/897,576.
Final Office Action dated May 5, 2006 for U.S. Appl. No. 10/897,576.
Notice of Allowance dated Jul. 29, 2008 for U.S. Appl. No. 10/897,576.
Non-Final Office Action dated May 12, 2008 for U.S. Appl. No. 10/930,179.
Non-Final Office Action dated Aug. 21, 2007 for U.S. Appl. No. 10/930,179.
Notice of Allowance dated Sep. 11, 2008 for U.S. Appl. No. 10/930,179.
Non-Final Office Action dated Aug. 22, 2007 for U.S. Appl. No. 10/930,187.
Final Office Action dated May 13, 2008 for U.S. Appl. No. 10/930,187.
Notice of Allowance dated Jul. 28, 2008 for U.S. Appl. No. 10/930,187.
Non-Final Office Action dated Aug. 7, 2009 for U.S. Appl. No. 10/930,456.
Non-Final Office Action dated Sep. 3, 2008 for U.S. Appl. No. 10/930,456.
Non-Final Office Action dated Mar. 14, 2008 for U.S. Appl. No. 10/930,456.
Final Office Action dated Feb. 17, 2010 for U.S. Appl. No. 10/930,456.
Final Office Action dated Feb. 24, 2009 for U.S. Appl. No. 10/930,456.
Advisory Action dated May 25, 2010 for U.S. Appl. No. 10/930,456.
Non-Final Office Action dated Nov. 13, 2008 for U.S. Appl. No. 10/930,175.
Non-Final Office Action dated Apr. 18, 2008 for U.S. Appl. No. 11/283,154.
Notice of Allowance dated Sep. 29, 2008 for U.S. Appl. No. 11/283,154.
International Search Report and Written Opinion dated Nov. 4, 2008 for PCT/US08/09040.
Non-Final Office Action dated Sep. 5, 2008 for U.S. Appl. No. 12/018,144.
Non-Final Office Action dated Apr. 14, 2010 for U.S. Appl. No. 12/028,586.
International Search Report dated Jun. 4, 2009 for PCT/US09/00635).
Non-Final Office Action dated Aug. 12, 2008 for U.S. Appl. No. 11/961,884.
Final Office Action dated Mar. 13, 2009 for U.S. Appl. No. 11/961,884.
Notice of Allowance dated Sep. 8, 2009 for U.S. Appl. No. 11/961,884.
Non-Final Office Action dated Sep. 3, 2009 for U.S. Appl. No. 11/961,910.
Non-Final Office Action dated Sep. 8, 2008 for U.S. Appl. No. 11/961,910.
Final Office Action dated Apr. 9, 2009 for U.S. Appl. No. 11/961,910.
Final Office Action dated Apr. 13, 2010 for U.S. Appl. No. 11/961,910.
Bursky: "Scalable Processors Add Fuel to Network Data Rates". Electronic Design. Online May 26, 2005. Retrieved from Internet Sep. 15, 2009. Online ID#10398 <http://electronicdesign.com/Articles/Print.cfm?ArticleID=10398>.

Flip-flop (electronics), http://en.wikipedia.org/wiki/Flip-flop_(electronics), Jun. 2010.

"PCI Express Base Specification", Revision 1.0, Apr. 29, 2002, PCI-SIG, pp. 1, 17, and 2742.

Office Action dated Jun. 28, 2010 for U.S. Appl. No. 10/898,007.

Notice of Allowance dated Aug. 6, 2010 for U.S. Appl. No. 10/930,455.

Final Office Action dated Aug. 19, 2010 for U.S. Appl. No. 10/931,003.

Non-Final Office Action dated Aug. 3, 2010 for U.S. Appl. No. 10/931,014.

Non-Final Office Action dated Jul. 2, 2010 for U.S. Appl. No. 11/961,910.

Non-Final Office Action dated Aug. 4, 2010 for U.S. Appl. No. 12/261,808.

Non-Final Office Action dated Jul. 15, 2010 for U.S. Appl. No. 12/582,622.

"Reduced Gigabit Media Independent Interface," Apr. 2002, http://www.hp.com/rnd/pdfs/RGMIIy2-_0_final_hp.pdf.

Notice of Allowance dated Dec. 9, 2010 for U.S. Appl. No. 10/898,007.

Notice of Allowance dated Feb. 7, 2011 for U.S. Appl. No. 10/930,455.

Non-Final Office Action dated Jan. 28, 2011 for U.S. Appl. No. 10/931,003.

Non-Final Office Action dated May 24, 2011 for U.S. Appl. No. 10/930,937.

Final Office Action dated Jan. 4, 2011 for U.S. Appl. No. 10/931,014.

Notice of Allowance dated Jun. 1, 2011 for U.S. Appl. No. 11/831,877.

Final Office Action dated Jan. 11, 2011 for U.S. Appl. No. 11/961,910.

Final Office Action dated Jan. 28, 2011 for U.S. Appl. No. 12/261,808.

Final Office Action dated Nov. 17, 2010 for U.S. Appl. No. 12/582,622.

Non-Final Office Action dated Feb. 9, 2011 for U.S. Appl. No. 12/582,622.

Non-Final Office Action dated May 27, 2010 for U.S. Appl. No. 12/627,915.

Final Office Action dated Dec. 3, 2010 for U.S. Appl. No. 12/627,915.

Non-Final Office Action dated Dec. 21, 2010 for U.S. Appl. No. 12/815,092.

Non-Final Office Action dated Jun. 9, 2011 for U.S. Appl. No. 12/028,586.

Notice of Allowance dated Aug. 31, 2011 for U.S. Appl. No. 10/930,938.

Final Office Action dated Aug. 22, 2011 for U.S. Appl. No. 10/931,003.

Final Office Action dated Sep. 6, 2011 for U.S. Appl. No. 12/582,622.

* cited by examiner

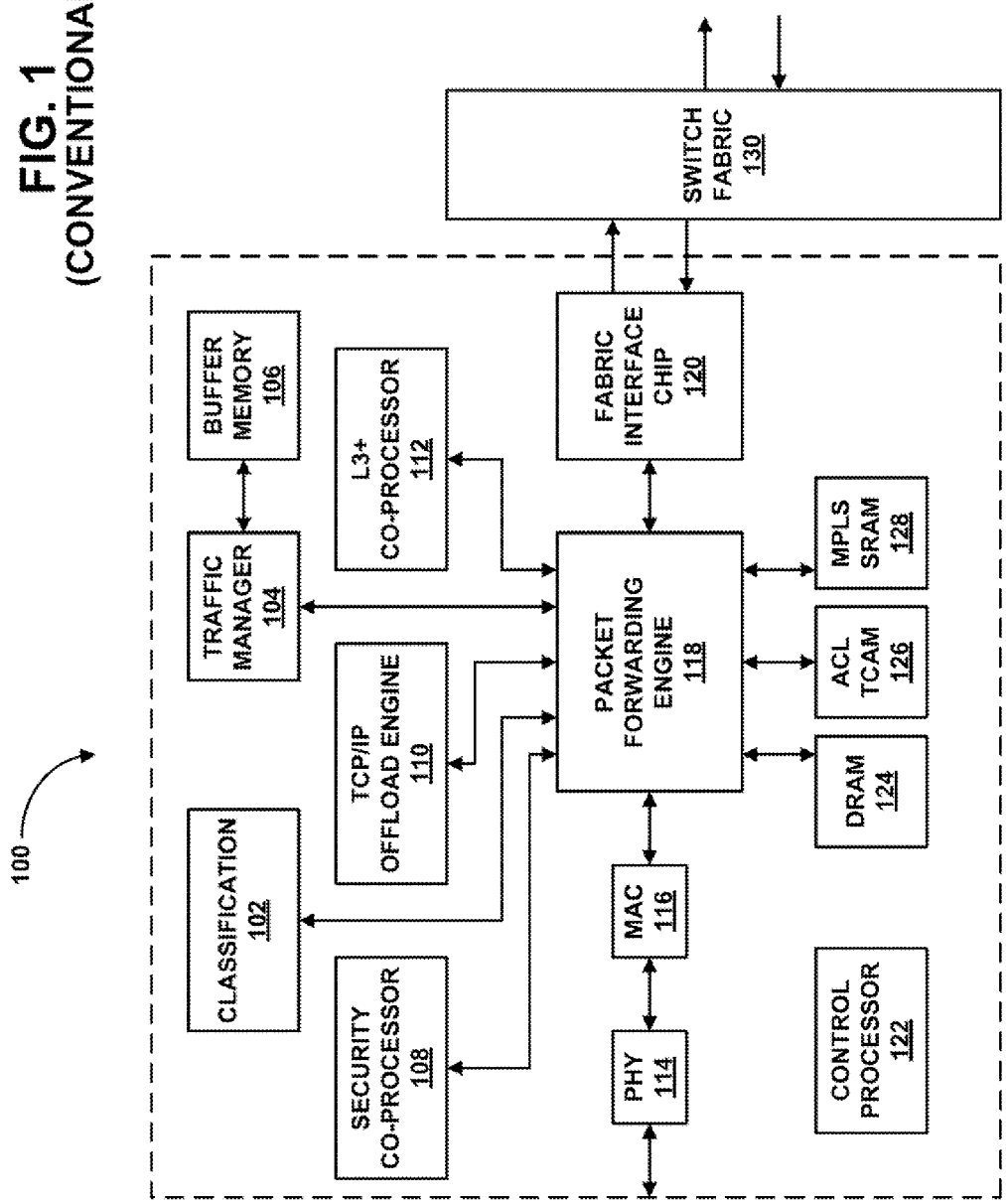
FIG. 1 (CONVENTIONAL)

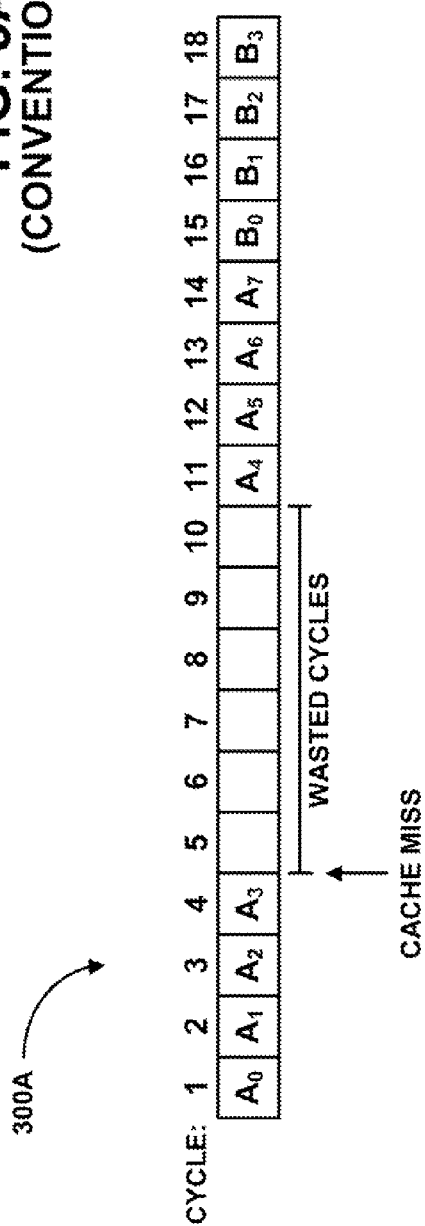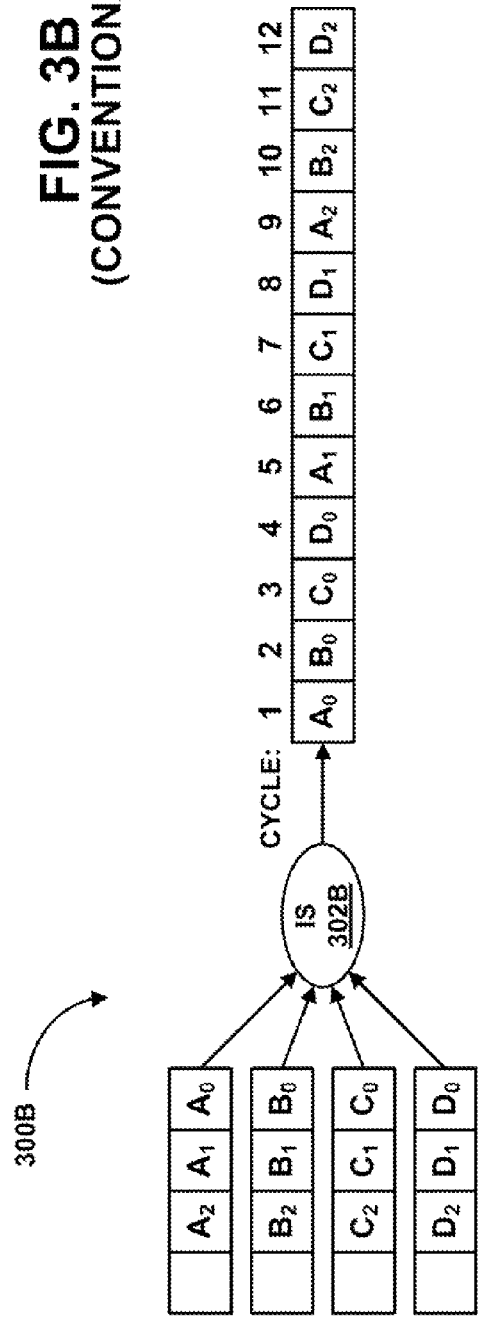

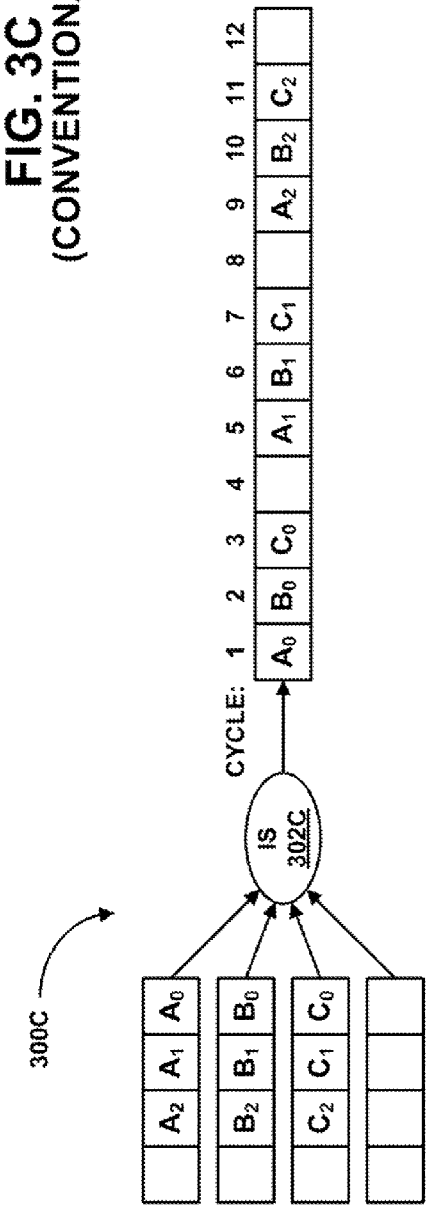
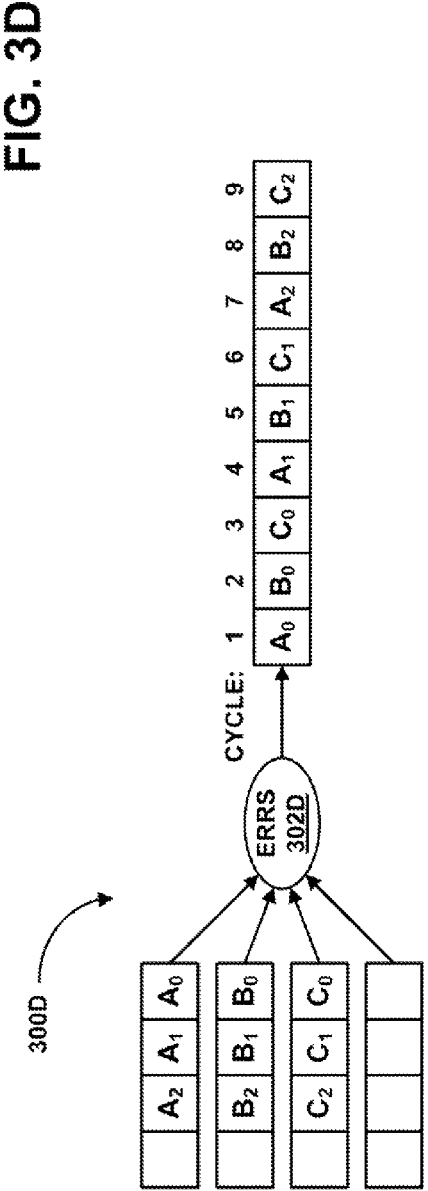

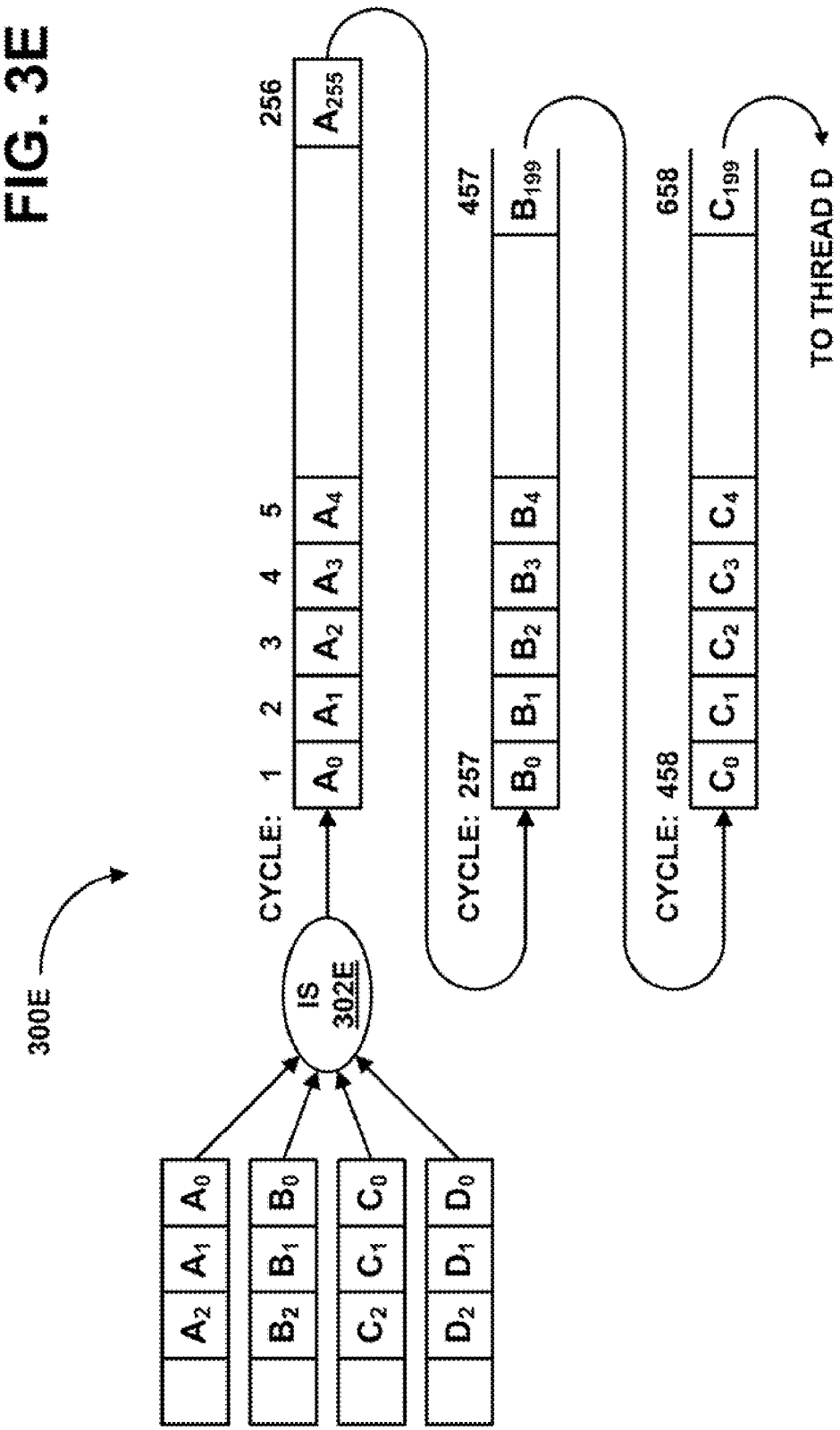

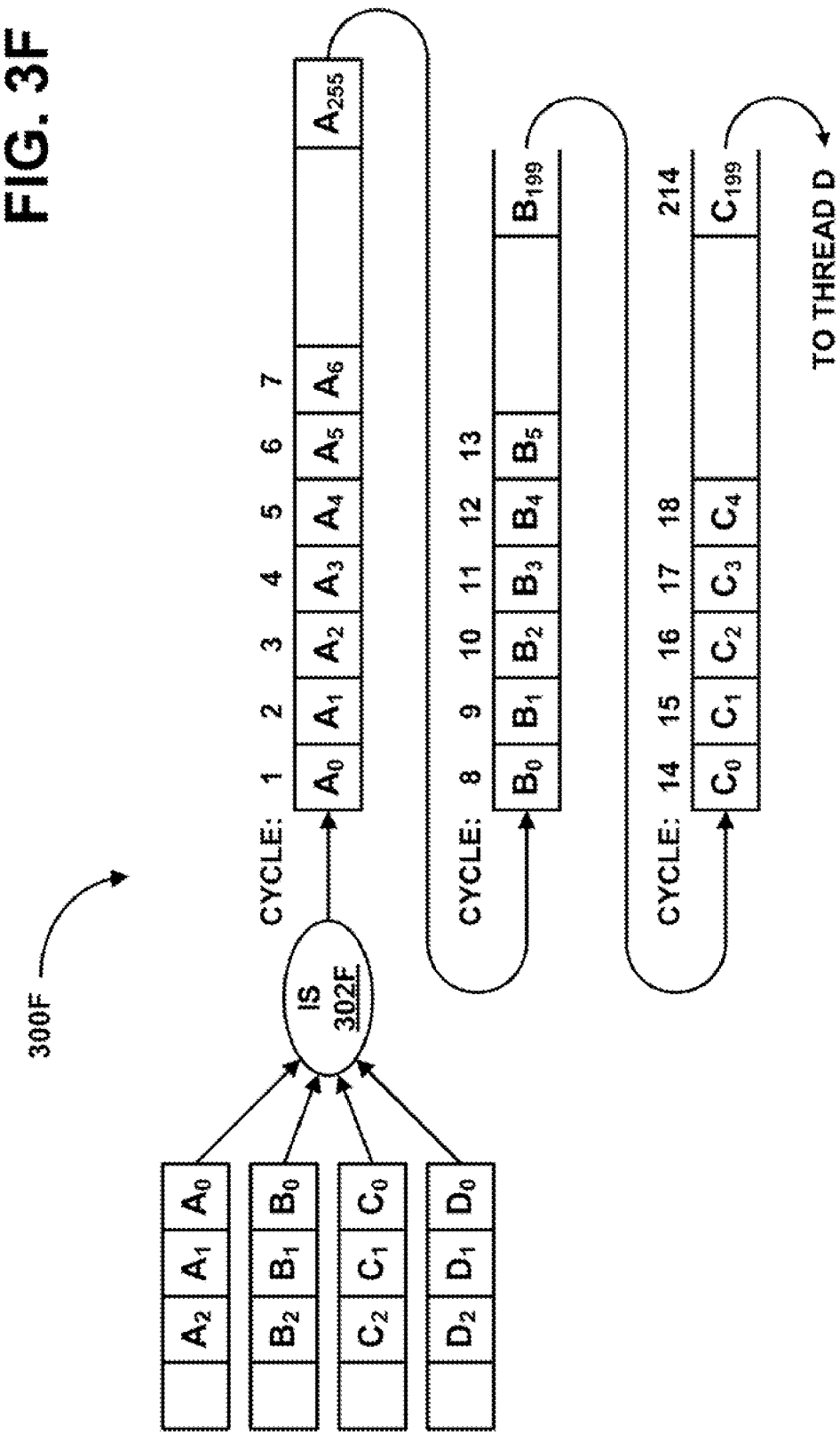

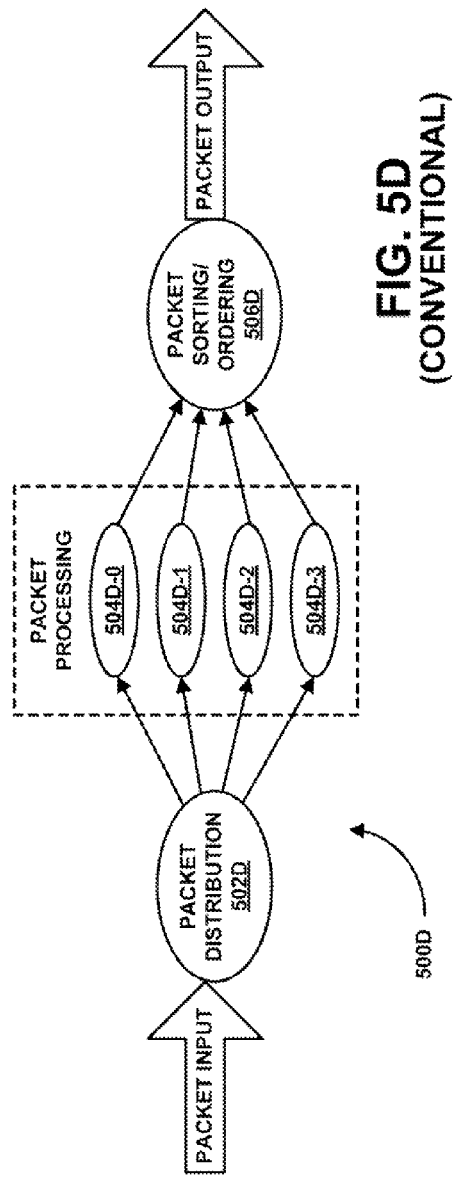
FIG. 5D (CONVENTIONAL)

FIG. 5G

MESSAGES FROM CPU TO PCIe INTERFACE UNIT

DMA MESSAGE IN WORD 0

| 63 60 59 58 57 56 | 49 | 39 | 0 |
|---|---|---|---|
| | RETURN MESSAGE TARGET ID | MESSAGE TAG ID | DMA SOURCE ADDRESS |

DMA MESSAGE IN WORD 1

| 63 62 61 59 | 39 | 0 |
|---|---|---|
| | DMA DATA BYTE COUNT | DMA DESTINATION ADDRESS |

MESSAGES FROM PCIe INTERFACE UNIT TO CPU

RETURN MESSAGE WORD

| 63 | 13 12 11 10 9 | 0 |
|---|---|---|
| | | MESSAGE TAG ID |

DELEGATING NETWORK PROCESSOR OPERATIONS TO STAR TOPOLOGY SERIAL BUS INTERFACES

RELATED APPLICATIONS

This application is a continuation of Ser. No. 11/831,887, filed Jul. 31, 2007, which is incorporated herein by reference and all priorities claimed.

FIELD

The invention relates to the field of computers and telecommunications, and more particularly to an advanced processor for use in computers and telecommunications applications.

BACKGROUND

Modern computers and telecommunications systems provide great benefits including the ability to communicate information around the world. Conventional architectures for computers and telecommunications equipment include a large number of discrete circuits, which causes inefficiencies in both the processing capabilities and the communication speed.

For example, FIG. 1 illustrates such a conventional line card employing a number of discrete chips and technologies. In FIG. 1, conventional line card 100 includes the following discrete components: Classification 102, Traffic Manager 104, Buffer Memory 106, Security Co-Processor 108, Transmission Control Protocol (TCP)/Internet Protocol (IP) Offload Engine 110, L3+ Co-Processor 112, Physical Layer Device (PHY) 114, Media Access Control (MAC) 116, Packet Forwarding Engine 118, Fabric Interface Chip 120, Control Processor 122, Dynamic Random-Access Memory (DRAM) 124, Access Control List (ACL) Ternary Content-Addressable Memory (TCAM) 126, and Multiprotocol Label Switching (MPLS) Static Random-Access Memory (SRAM) 128. The card further includes Switch Fabric 130, which may connect with other cards and/or data.

Advances in processors and other components have improved the ability of telecommunications equipment to process, manipulate, store, retrieve and deliver information. Recently, engineers have begun to combine functions into integrated circuits to reduce the overall number of discrete integrated circuits, while still performing the required functions at equal or better levels of performance. This combination has been spurred by the ability to increase the number of transistors on a chip with new technology and the desire to reduce costs. Some of these combined integrated circuits have become so highly functional that they are often referred to as a System on a Chip (SoC). However, combining circuits and systems on a chip can become very complex and pose a number of engineering challenges. For example, hardware engineers want to ensure flexibility for future designs and software engineers want to ensure that their software will run on the chip and future designs as well.

The demand for sophisticated new networking and communications applications continues to grow in advanced switching and routing. In addition, solutions such as content-aware networking, highly integrated security, and new forms of storage management are beginning to migrate into flexible multi-service systems. Enabling technologies for these and other next generation solutions must provide intelligence and high performance with the flexibility for rapid adaptation to new protocols and services.

In order to take advantage of such high performance networking and data processing capability, it is important that such systems be capable of communicating with a variety of high bandwidth peripheral devices, preferably using a standardized, high-bandwidth bus. Although many proprietary high-bandwidth buses are possible, using a standardized bus allows the system to interface with a broader variety of peripherals, and thus enhances the overall value and utility of the system.

One high-bandwidth standardized bus that has become popular in recent years is the PCI Express (PCI-E or PCIe) interface. The PCIe interface, originally proposed by Intel as a replacement for the very popular but bandwidth limited personal computer PCI interface, is both high bandwidth and, due to the fact that it has now become a standard component on personal computer motherboards, very widely adopted. Hundreds or thousands of different peripherals are now available that work with the PCIe interface, making this interface particularly useful for the present advanced processing system.

In contrast to the earlier, parallel, PCI system, which encountered bandwidth limitations due to problems with keeping the large number of parallel circuit lines in synchronization with each other at high clock speeds, the PCIe system is a very fast serial system. Serial systems use only a very small limited number of circuit lines, typically two to transmit and two to receive, and this simpler scheme holds up better at high clock speeds and high data rates. PCIe further increases bandwidth by allowing for multiple serial circuits. Depending upon the PCIe configuration, there can be as few as 1 bidirectional circuit, or as many as 32 bidirectional serial circuits.

Although, on a hardware level, the serial PCIe system is radically different from the earlier parallel PCI system, the earlier PCI system was extremely successful, and the computer industry had made a massive investment in earlier generation PCI hardware and software. To help make the much higher bandwidth PCIe system compatible with the preexisting PCI hardware and software infrastructure, PCIe was designed to mimic much of the earlier parallel PCI data transport conventions. Earlier generation software thus can continue to address PCIe devices as if they were PCI devices, and the PCIe circuitry transforms the PCI data send and receive requests into serial PCIe data packets, transmits or receives these data packets, and then reassembles the serial PCIe data packets back into a format that can be processed by software (and hardware) originally designed for the PCI format. The PCIe design intention of maintaining backward compatibility, while providing much higher bandwidth, has been successful and PCIe has now become a widely used computer industry standard.

Although other workers, such as Stufflebeam (U.S. Pat. No. 7,058,738) have looked at certain issues regarding interfacing multiple CPUs to multiple I/O devices through a single switch (such as a PCIe switch), this previous work has focused on less complex and typically lower-performance multiple CPU configurations, that do not have to contend with the issues that result when multiple cores must coordinate their activity via other high-speed (and often on-chip) communication rings and interconnects.

Consequently, what is needed is an advanced processor that can take advantage of the new technologies while also providing high performance functionality. Additionally, this technology would be especially helpful it included flexible modification ability, such as the ability to interface with multiple high-bandwidth peripheral devices, using high-bandwidth star topology buses such as the PCIe bus.

SUMMARY

The present invention provides useful novel structures and techniques for overcoming the identified limitations, and provides an advanced processor that can take advantage of new technologies while also providing high performance functionality with flexible modification ability. The invention employs an advanced architecture System on a Chip (SoC) including modular components and communication structures to provide a high performance device.

This advanced processor comprises a plurality of multi-threaded processor cores each having a data cache and instruction cache. A data switch interconnect (DSI) is coupled to each of the processor cores by its respective data cache, and configured to pass information among the processor cores. A level 2 (L2) cache, a memory bridge, and/or a super memory bridge can also be coupled to the data switch interconnect (DSI) and configured to store information accessible to the processor cores.

A messaging network is coupled to each of the processor cores by the core's respective instruction caches (message station). A plurality of communication ports are connected to the messaging network. In one aspect of the invention, the advanced telecommunications processor further comprises an interface switch interconnect (ISI) coupled to the messaging network and the plurality of communication ports and configured to pass information among the messaging network and the communication ports. This interface switch interconnect may also communicate with the super memory bridge. The super memory bridge may also communicate with one or more communication ports and the previously discussed DSI.

In the embodiment of the invention disclosed here, the messaging network and the ISI connect to a PCI express (PCIe) interface, enabling the processor to interface with a broad variety of high-bandwidth PCIe peripherals.

Advantages of the PCIe embodiment of the invention include the ability to provide high bandwidth communications between computer systems and a large number of peripherals in an efficient, flexible, and cost-effective manner.

BRIEF DESCRIPTION OF THE FIGURES

The invention is described with reference to the Figures, in which:

FIG. 1 illustrates a conventional line card;

FIG. 3A illustrates a conventional single-thread single-issue processing;

FIG. 3B illustrates a conventional simple multithreaded scheduling;

FIG. 3C illustrates a conventional simple multithreaded scheduling with a stalled thread;

FIG. 3D illustrates an eager round-robin scheduling according to an embodiment of the invention;

FIG. 3E illustrates a multithreaded fixed-cycle scheduling according to an embodiment of the invention;

FIG. 3F illustrates a multithreaded fixed-cycle with eager round-robin scheduling according to an embodiment of the invention;

FIG. 5D illustrates network traffic in a conventional processing system;

FIG. 5G shows an overview of the data fields of the 64 bit word messages sent between the FMN/ISI and the PCIe interface.

DETAILED DESCRIPTION

The invention is described with reference to specific architectures and protocols. Those skilled in the art will recognize that the description is for illustration and to provide the best mode of practicing the invention. The description is not meant to be limiting and references to telecommunications and other applications may be equally applicable to general computer applications, for example, server applications, distributed shared memory applications and so on. As described herein, reference is made to Ethernet Protocol, Internet Protocol, Hyper Transport Protocol and other protocols, but the invention may be applicable to other protocols as well. Moreover, reference is made to chips that contain integrated circuits while other hybrid or meta-circuits combining those described in chip form is anticipated. Additionally, reference is made to an exemplary MIPS architecture and instruction set, but other architectures and instruction sets can be used in the invention. Other architectures and instruction sets include, for example, x86, PowerPC, ARM and others.

A. Architecture

The architecture is focused on a system designed to consolidate a number of the functions performed on the conventional line card and to enhance the line card functionality. In one embodiment, the invention is an integrated circuit that includes circuitry for performing many discrete functions. The integrated circuit design is tailored for communication processing. Accordingly, the processor design emphasizes memory intensive operations rather than computationally intensive operations. The processor design includes an internal network configured for relieving the processor of burdensome memory access processes, which are delegated to other entities for separate processing. The result is a high efficient memory access and threaded processing.

Again, one embodiment of the invention is designed to consolidate a number of the functions performed on the conventional line card of FIG. 1, and to enhance the line card functionality. In one embodiment, the invention is an integrated circuit that includes circuitry for performing many discrete functions. The integrated circuit design is tailored for communication processing. Accordingly, the processor design emphasizes memory intensive operations rather than computationally intensive operations. The processor design includes an internal network configured for high efficient memory access and threaded processing as described below.

Figure 2A:
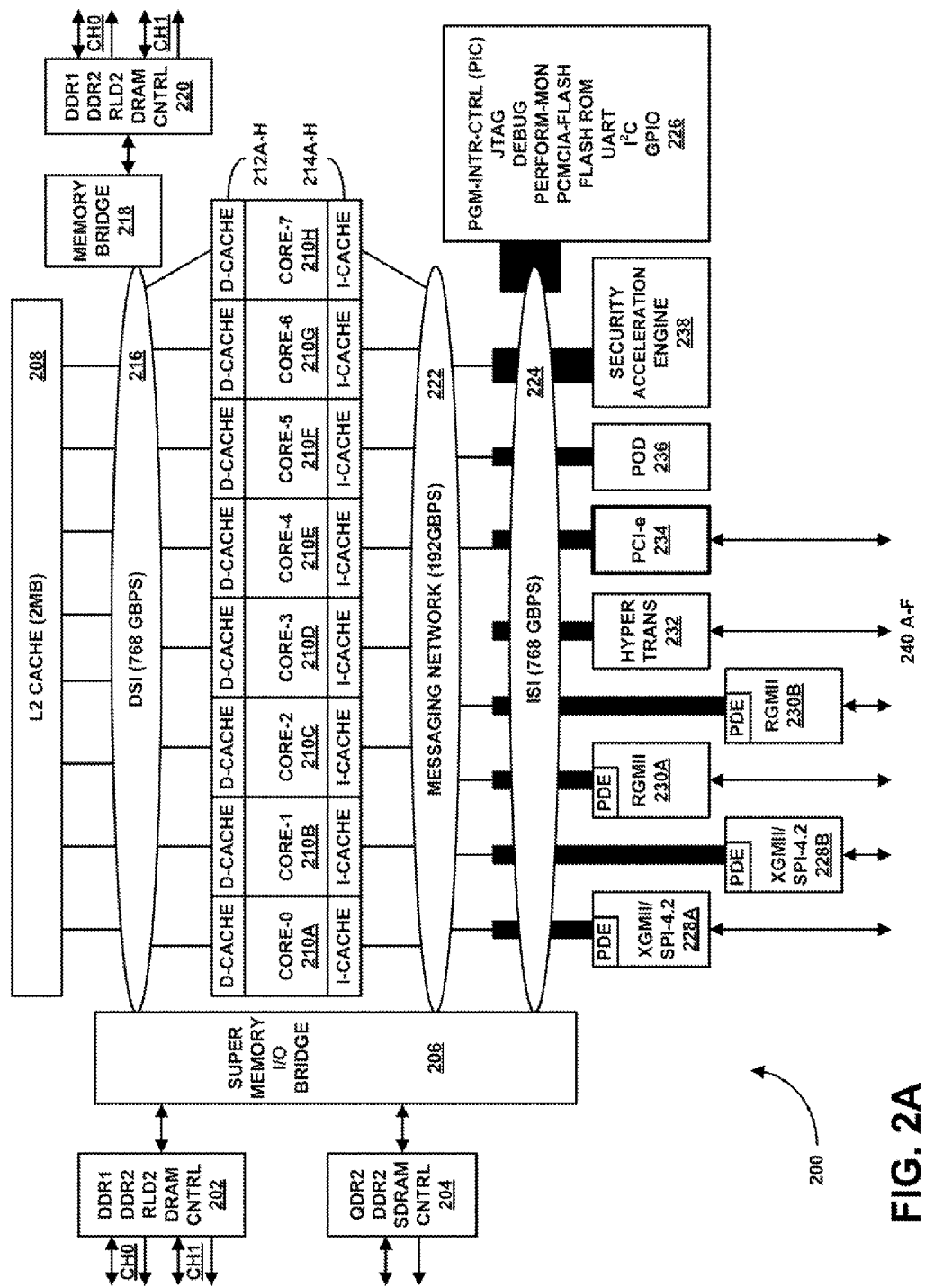
FIG. 2A illustrates an exemplary advanced processor according to an embodiment of the invention, showing how the PCIe interface connects to the processor.

FIG. 2A illustrates an exemplary advanced processor (200) according to an embodiment of the invention. The advanced processor is an integrated circuit that can perform many of the functions previously tasked to specific integrated circuits. For example, the advanced processor includes a packet forwarding engine, a level 3 co-processor and a control processor. The processor can include other components, as desired. As shown herein, given the number of exemplary functional components, the power dissipation is approximately 20 watts in the exemplary embodiment. Of course, in other embodiments of the invention, the power dissipation may be more or less than about 20 watts.

The exemplary processor is designed as a network on a chip. This distributed processing architecture allows components to communicate with one another and not necessarily share a common clock rate. For example, one processor component could be clocked at a relatively high rate while another processor component is clocked at a relatively low rate. The network architecture further supports the ability to add other components in future designs by simply adding the component to the network. For example, if a future communication interface is desired, that interface can be laid out on the processor chip and coupled to the processor network. Then, future processors can be fabricated with the new communication interface.

The design philosophy is to create a processor that can be programmed using general purpose software tools and reusable components. Several exemplary features that support this design philosophy include: static gate design; low-risk custom memory design; flip-flop based design; design-for-testability including a full scan, memory built-in self-test (BIST), architecture redundancy and tester support features; reduced power consumption including clock gating; logic gating and memory banking; datapath and control separation including intelligently guided placement; and rapid feedback of physical implementation.

The software philosophy is to enable utilization of industry standard development tools and environment. The desire is to program the processing using general purpose software tools and reusable components. The industry standard tools and environment include familiar tools, such as gcc/gdb and the ability to develop in an environment chosen by the customer or programmer.

The desire is also to protect existing and future code investment by providing a hardware abstraction layer (HAL) definition. This enables relatively easy porting of existing applications and code compatibility with future chip generations.

Turning to the CPU core, the core is designed to be MIPS64 compliant and have a frequency target in the range of approximately 1.5 GHz+. Additional exemplary features supporting the architecture include: 4-way multithreaded single issue 10-stage pipeline; real time processing support including cache line locking and vectored interrupt support; 32 KB 4-way set associative instruction cache; 32 KB 4-way set associative data cache; and 128-entry translation-lookaside buffer (TLB).

One of the important aspects of the exemplary embodiment is the high-speed processor input/output (I/O), which is supported by: two XGMII/SPI-4 (e.g., boxes 228a and 228b of FIG. 2A); three 1 Gb MACs; one 16-bit HyperTransport (e.g., box 232) that can scale to 800/1600 MHz memory, including one Flash portion (e.g., box 226 of FIG. 2A) and two Quad Data Rate (QDR2)/Double Data Rate (DDR2) SRAM portions; two 64-bit DDR2 channels that can scale to 400/800 MHz; and communication ports including PCIe (PCI-expanded or Expanded Peripheral Component Interconnect) ports (e.g., box 234 of FIG. 2A), Joint Test Access Group (JTAG) and Universal Asynchronous Receiver/Transmitter (UART) (e.g., box 226).

The PCIe Communication Port:

Use of high bandwidth star topology serial communication buses, such as the PCIe bus, is useful because it helps expand the power and utility of the processor. Before discussing how PCIe technology may be integrated into this type of processor, a more detailed review of PCIe technology is warranted.

As previously discussed, the PCIe bus is composed of one or more (usually multiple) high-bandwidth bidirectional serial connections. Each bidirectional serial connection is called a "lane". These serial connections are in turn controlled by a PCIe switch that can create multiple point-to-point serial connections between various PCIe peripherals (devices) and the PCIe switch in a star topology configuration. As a result, each device gets its own direct serial connection to the switch, and doesn't have to share this connection with other devices. This topology, along with the higher inherent speed of the serial connection, helps increase the bandwidth of the PCIe bus. To further increase bandwidth, a PCIe device can connect to the switch with between 1 and 32 lanes. Thus a PCIe device that needs higher bandwidth can utilize more PCIe lanes, and a PCIe device that needs lower bandwidth can utilize fewer PCIe lanes.

Note that the present teaching of efficient means to interlace serial buses to this type of advanced processor is not limited to the PCIe protocol per-se. As will be discussed, these techniques and methods can be adapted to work with a broad variety of different star topology high-speed serial bus protocols, including HyperTransport, InfiniBand, RapidIO, and StarFabric. To simplify discussion, however, PCIe will be used throughout this disclosure as a specific example.

As previously discussed, in order to maximize backward compatibility with the preexisting PCI parallel bus, PCIe designers elected to make the new serial aspects of the PCIe bus as transparent (unnoticeable) to system hardware and software as possible. They did this by making the high level interface of the PCIe bus resemble the earlier PCI bus, and put the serial data management functions at a lower level, so that preexisting hardware and software would not have to contend with the very different PCIe packet based serial data exchange format. Thus PCIe data packets send a wide variety of different signals, including control signals and interrupt signals.

Detailed information on the PCI express can be found in the book "PCI express system architecture" by Budruk, Anderson, and Shanley, Mindeshare, Inc. (2004), Addison Wesley.

Briefly, the PCIe protocol consists of the Physical layer (containing a logical sublayer and an electrical sublayer), the transaction layer, and a data link layer.

The physical layer (sometimes called the PIPE or PHY) controls the actual serial lines connecting various PCIe devices. It allows devices to form one or more serial bidirectional "lanes" with the central PCIe switch, and utilizes each device's specific hardware and bandwidth needs to determine exactly how many lanes should be allocated to the device. Since all communication is by the serial links, other messages, such as interrupts and control signals are also sent by serial data packets through these lanes. Instead of using clock pulses to synchronize data (which use a lot of bandwidth), the data packets are instead sent using a sequential 8-bit/10-bit encoding scheme which in itself carries enough clock information to ensure that the devices do not lose track of where one byte begins and another byte ends. If data is being sent through multiple lanes to a device, this data will usually be interleaved with sequential bytes being sent on different lanes, which further increases speed. PCIe speeds are typically in the 2.5 Gigabit/second ranges, with faster devices planned for the near future.

The transaction layer manages exactly what sort of traffic is moving over the serial lanes at any given moment of time. It utilizes credit-based flow control. PCIe devices signals (get credit for) any extra receive buffers they may have. Whenever a sending device sends a transaction layer packet (here termed a PCIe-TLP to distinguish this from a different "thread level parallelism" TLP acronym) to a receiving device, it, the sending device deducts a credit from this account, thus ensuring that the buffer capability of the receiving device is not exceeded. When the receiving device has processed the data, it sends a signal back to the sending device signaling that it has free buffers again. This way, a fair number of PCIe-TLP's can be reliably sent without cluttering bandwidth with a lot of return handshaking signals for each PCIe-TLP.

The data link layer handles the transaction layer packets. In order to detect any PCIe-TLP send or receive errors, the data link error bundles the PCIe-TLP with a 32 bit CRC checksum. If, for some reason, a given PCIe-TLP fails checksum verification, this failure is communicated back to the originating device as a NAK using a separate type of data link layer packet (DLLP). The originating device can then retransmit the PCIe-TLP.

Further details of how the PCIe bus can be integrated with the advanced processor will be given later in this discussion.

In addition to the PCIe bus, the interface may contain many other types of devices. Also included as part of the interface are two Reduced GMII (RGMII) (e.g., boxes 230a and 230b of FIG. 2A) ports. Further, Security Acceleration Engine (SAE) (e.g., box 238 of FIG. 2A) can use hardware-based acceleration for security functions, such as encryption, decryption, authentication, and key generation. Such features can help software deliver high performance security applications, such as IPSec and SSL.

The architecture philosophy for the CPU is to optimize for thread level parallelism (TLP) rather than instruction level parallelism (ILP) including networking workloads benefit from TLP architectures, and keeping it small.

The architecture allows for many CPU instantiations on a single chip, which in turn supports scalability. In general, super-scalar designs have minimal performance gains on memory bound problems. An aggressive branch prediction is typically unnecessary for this type of processor application and can even be wasteful.

The exemplary embodiment employs narrow pipelines because they typically have better frequency scalability. Consequently, memory latency is not as much of an issue as it would be in other types of processors, and in fact, any memory latencies can effectively be hidden by the multi-threading, as described below.

Embodiments of the invention can optimize the memory subsystem with non-blocking loads, memory reordering at the CPU interface, and special instruction for semaphores and memory barriers.

In one aspect of the invention, the processor can acquire and release semantics added to load/stores. In another aspect of embodiments of the invention, the processor can employ special atomic incrementing for timer support.

As described above, the multithreaded CPUs offer benefits over conventional techniques. An exemplary embodiment of the invention employs fine grained multithreading that can switch threads every clock and has 4 threads available for issue.

The multithreading aspect provides for the following advantages: usage of empty cycles caused by long latency operations; optimized for area versus performance trade-off; ideal for memory bound applications; enable optimal utilization of memory bandwidth; memory subsystem; cache coherency using MOSI (Modified, Own, Shared, Invalid) protocol; full map cache directory including reduced snoop bandwidth and increased scalability over broadcast snoop approach; large on-chip shared dual banked 2 MB L2 cache; error checking and correcting (ECC) protected caches and memory; 2 64-bit 400/800 DDR2 channels (e.g., 12.8 GByte/s peak bandwidth) security pipeline; support of on-chip standard security functions (e.g., AES, DES/3DES, SHA-1, MD5, and RSA); allowance of the chaining of functions (e.g., encrypt->sign) to reduce memory accesses; 4 Gbs of bandwidth per security-pipeline, excluding RSA; on-chip switch interconnect; message passing mechanism for ultra-chip communication; point-to-point connection between super-blocks to provide increased, scalability over a shared bus approach; 16 byte full-duplex links for data messaging (e.g., 32 GB/s of bandwidth per link, at 1 GHz); and credit-based flow control mechanism.

Some of the benefits of the multithreading technique used with the multiple processor cores include memory latency tolerance and fault tolerance.

Figure 2B:
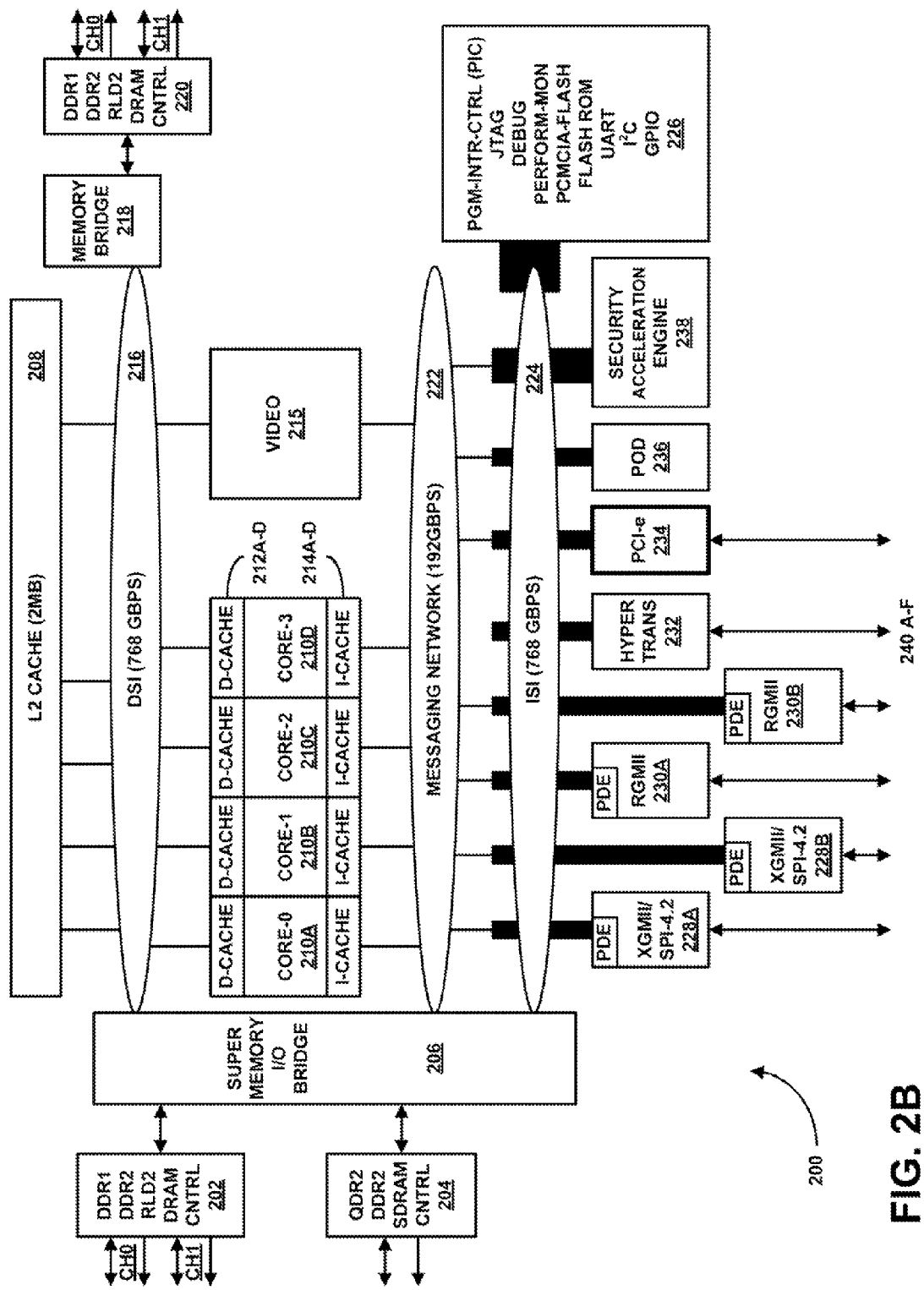
FIG. 2B illustrates an exemplary advanced processor according to an alternate embodiment of the invention, again showing how the PCIe interface connects to the processor.

FIG. 2B illustrates an exemplary advanced processor according to an alternate embodiment of the invention. This embodiment is provided to show that the architecture can be modified to accommodate other components, for example, video processor 215. In such a case, the video processor can communicate with the processor cores, communication networks (e.g. DSI and Messaging Network) and other components.

B. Processor Cores and Multi-Threading

The exemplary advanced processor 200 of FIG. 2A includes a plurality of multithreaded processor cores 210a-h. Each exemplary core includes an associated data cache 212a-h and instruction cache 214a-h. Data Switch Interconnect (DSI) 216 may be coupled to each of the processor cores 210a-h and configured to pass data among the processor cores and between the L2 cache 208 and memory bridges 206, 208 for main memory access. Additionally, a messaging network 222 may be coupled to each of the processor cores 210a-h and a plurality of communication ports 240a-f. While eight cores are depicted in FIG. 2A, a lesser or greater number of cores can be used in the invention. Likewise, in aspects of the invention, the cores can execute different software programs and routines, and even run different op crating systems. The ability to run different software programs and operating systems on different cores within a single unified platform can be particularly useful where legacy software is desired to be run on one or more of the cores under an older operating system, and newer software is desired to be run on one or more other cores under a different operating system or systems. Similarly, as the exemplary processor permits multiple separate functions to be combined within a unified platform, the ability to run multiple different software and operating systems on the cores means that the disparate software associated with the separate functions being combined can continue to be utilized.

The exemplary processor includes the multiple CPU cores 210a-h capable of multithreaded operation. In the exemplary embodiment, there are eight 4-way multithreaded MIPS64-compatible CPUs, which are often referred to as processor cores. Embodiments of the invention can include 32 hardware contexts and the CPU cores may operate at over approximately 1.5 GHz. One aspect of the invention is the redundancy and fault tolerant nature of multiple CPU cores. So, for example, if one of the cores failed, the other cores would continue operation and the system would experience only slightly degraded overall performance. In one embodiment, a ninth processor core may be added to the architecture to ensure with a high degree of certainty that eight cores are functional.

The multithreaded core approach can allow software to more effectively use parallelism that is inherent in many packet processing applications. Most conventional processors use a single-issue, single-threaded architecture, but this has performance limitations in typical networking applications. In aspects of the invention, the multiple threads can execute different software programs and routines, and even run different operating systems. This ability, similar to that described above with respect to the cores, to run different software programs and operating systems on different threads within a single unified platform can be particularly useful where legacy software is desired to be run on one or more of the threads under an older operating system, and newer software is desired to be run on one or more other threads under a different operating system or systems. Similarly, as the exemplary processor permits multiple separate functions to be combined within a unified platform, the ability to run multiple different software and operating systems on the threads means that the disparate software associated with the separate functions being combined can continue to be utilized. Discussed below are some techniques used by the invention to improve performance in single and multi-threaded applications.

Referring now to FIG. 3A, a conventional single-thread single-issue processing is shown and indicated by the general reference character 300A. The cycle numbers are shown across the top of the blocks. "A" within the blocks can represent a first packet and "B" within the blocks can represent a next packet. The sub-numbers within the blocks can represent packet instructions and/or segments. The wasted cycles 5-10 after a cache miss, as shown, result from no other instructions being ready for execution. The system must essentially stall to accommodate the inherent memory latency and this is not desirable.

For many processors, performance is improved by executing more instructions per cycle, thus providing for instruction level parallelism (ILP). In this approach, more functional units are added to the architecture in order to execute multiple instructions per cycle. This approach is also known as a single-threaded, multiple-issue processor design. While offering some improvement over single-issue designs, performance typically continues to suffer due to the high-latency nature of packet processing applications in general. In particular, long-latency memory references usually result in similar inefficiency and increased overall capacity loss.

As an alternate approach, a multithreaded, single-issue architecture may be used. This approach takes advantage of, and more fully exploits, the packet level parallelism commonly found in networking applications. In short, memory latencies can be effectively hidden by an appropriately designed multithreaded processor. Accordingly, in such a threaded design, when one thread becomes inactive while waiting for memory data to return, the other threads can continue to process instructions. This can maximize processor use by minimizing wasted cycles experienced by other simple multi-issue processors.

Referring now to FIG. 3B, a conventional simple multi-threaded scheduling is shown and indicated by the general reference character 300B. Instruction Scheduler (IS) 302B can receive four threads: A, B, C, and D, as shown in the boxes to the left of IS 302B. Each cycle can simply select a different packet instruction from each of the threads in "round-robin" fashion, as shown. This approach generally works well as long as every thread has an instruction available for issue. However, such a "regular" instruction issue pattern cannot typically be sustained m actual networking applications. Common factors, such as instruction cache miss, data cache miss, data use interlock, and non-availability of a hardware resource can stall the pipeline.

Referring now to FIG. 3C, a conventional simple multi-threaded scheduling with a stalled thread is shown and indicated by the general reference character 300C. Instruction Scheduler (IS) 302C can receive four threads: A, B, and C, plus an empty "D" thread. As shown, conventional round-robin scheduling results in wasted cycles 4, 8, and 12, the positions where instructions from the D thread would fall if available. In this example, the pipeline efficiency loss is 25% during the time period illustrated. An improvement over this approach that is designed to overcome such efficiency losses is the "eager" round-robin scheduling scheme.

Referring now to FIG. 3D, an eager round-robin scheduling according to an embodiment of the invention is shown and indicated by the general reference character 300D. The threads and available instructions shown are the same as illustrated in FIG. 3C. However, in FIG. 3D, the threads can be received by an Eager Round-Robin Scheduler (ERRS) 302D. The eager round-robin scheme can keep the pipeline full by issuing instructions from each thread in sequence as long as instructions are available for processing. When one thread is "sleeping" and does not issue an instruction, the scheduler can issue an instruction from the remaining three threads at a rate of one every three clock cycles, for example. Similarly, if two threads are inactive, the scheduler can issue an instruction from the two active threads at the rate of one every other clock cycle. A key advantage of this approach is the ability to run general applications, such as those not able to take full advantage of 4-way multithreading, at full speed.

Other suitable approaches include multithreaded fixed-cycle scheduling.

Referring now to FIG. 3E, an exemplary multithreaded fixed-cycle scheduling is shown and indicated by the general reference character 300E. Instruction Scheduler (IS) 302E can receive instructions from four active threads: A, B, C, and D, as shown. In this programmable fixed-cycle scheduling a fixed number of cycles can be provided to a given thread before switching to another thread. In the example illustrated, thread A issues 256 instructions, which may be the maximum, allowed in the system, before any instructions are issued, from thread B. Once thread B is started, it may issue 200 instructions before handing off the pipeline to thread C, and so on.

Referring now to FIG. 3F, an exemplary multithreaded fixed-cycle with eager round-robin scheduling is shown and indicated by the general reference character 300F. Instruction Scheduler (IS) 302F can receive instructions from four active threads; A, B, C, and D, as shown. This approach may be used in order to maximize pipeline efficiency when a stall condition is encountered. For example, if thread A encounters a stall (e.g., a cache miss) before it has issued 256 instructions, the other threads may be used in a round-robin manner to "fill up" the potentially wasted cycles. In the example shown in FIG. 3F, a stall condition may occur while accessing the instructions for thread A after cycle 7, at which point the scheduler can switch to thread B for cycle 8. Similarly, another stall condition may occur while accessing the instructions for thread B after cycle 13, so the scheduler can then switch to thread C for cycle 14. In this example, no stalls occur during the accessing of instructions for thread C, so scheduling for thread C can continue though the programmed limit for the thread (e.g., 200), so that the last C thread instruction can be placed in the pipeline in cycle 214.

Figure 3G:
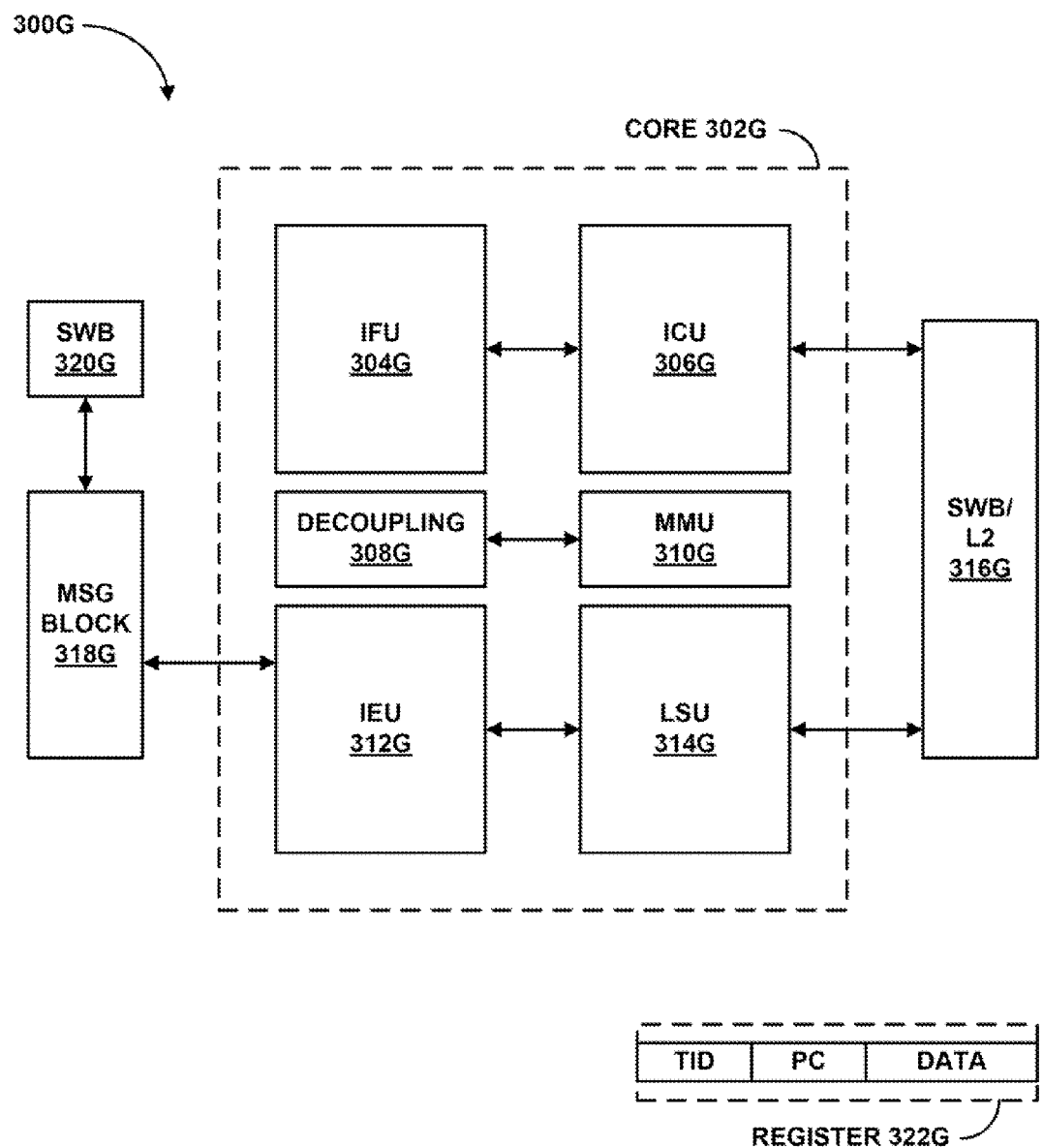
FIG. 3G illustrates a core with associated interface units according to an embodiment of the invention.

Referring now to FIG. 3G, a core with associated interface units according to an embodiment of the invention is shown and indicated by the general reference character 300G. Core 302G can include Instruction Fetch Unit (IFU) 304G, Instruction Cache Unit (ICU) 306G, Decoupling buffer 308G, Memory Management Unit (MMU) 310G, Instruction Execution Unit (IEU) 312G, and Load/Store Unit (LSU) 314. IFU 304G can interface with ICU 306G and IEU 312G can interface with LSU 314. ICU 306G can also interface with Switch Block (SWB)/Level 2 (L2) cache block 316G. LSU 314G, which can be a Level 1 (L1) data cache, can also interface with SWB/L2 316G. IEU 312G can interface with Message (MSG) Block 318G and, which can also interface with SWB 320G. Further, Register 322G for use in accordance with embodiments can include thread ID (TID), program counter (PC), and data fields.

According to embodiments of the invention, each MIPS architecture core may have a single physical pipeline, but may be configured to support multi-threading functions (i.e., four "virtual" cores). In a networking application, unlike a regular computational type of instruction scheme, threads are more likely to be waited on for memory accesses or other long latency operations. Thus, the scheduling approaches as discussed herein can be used to improve the overall efficiency of the system.

Figure 3H:
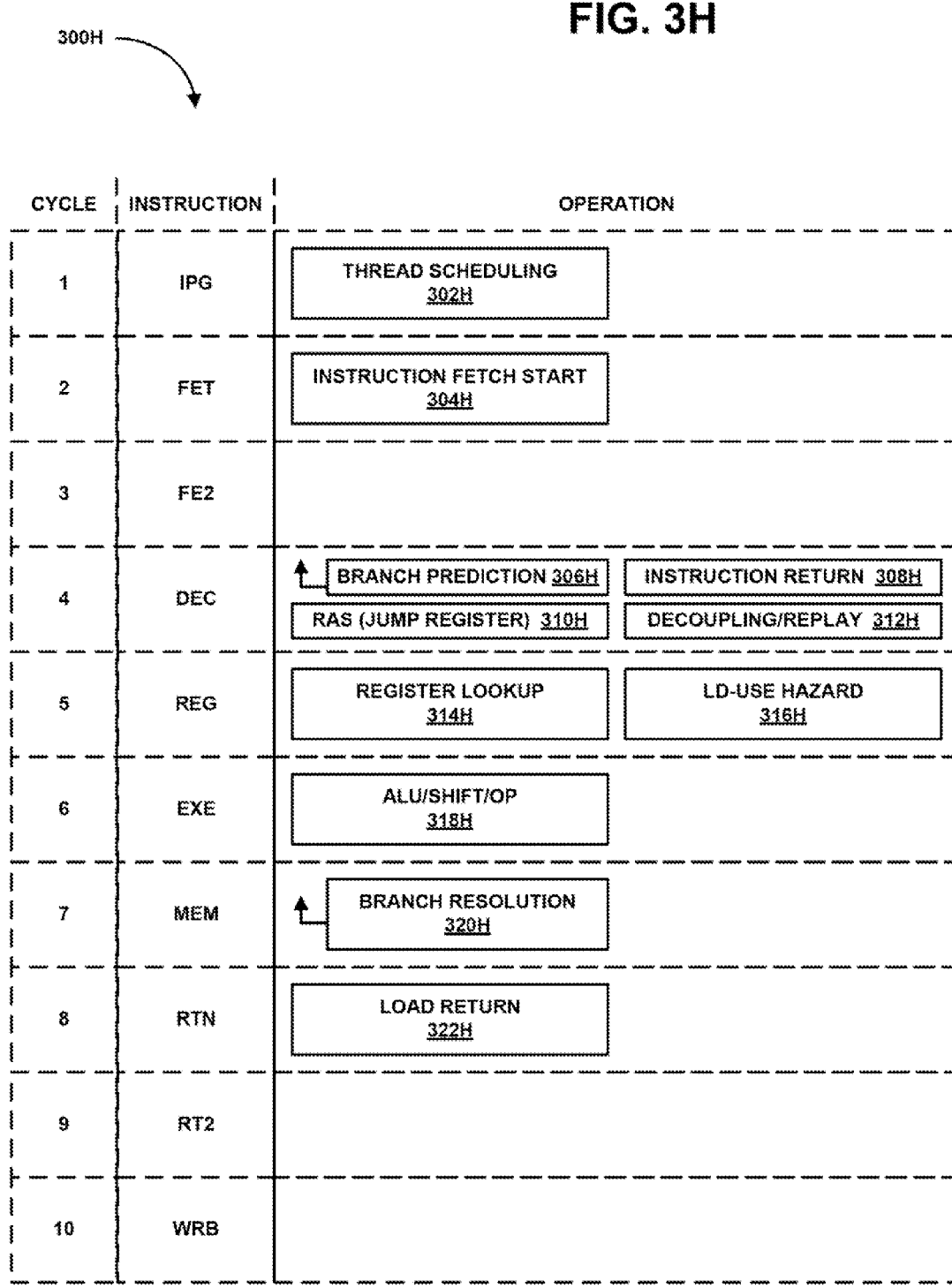
FIG. 3H illustrates an example pipeline of the processor according to embodiments of the invention.

Referring now to FIG. 3H, an exemplary 10-stage (i.e., cycle) processor pipeline is shown and indicated by the general reference character 300H. In general operation, each instruction can proceed down the pipeline and may take 10-cycles or stages to execute. However, at any given point in time, there can be up to 10 different instructions populating each stage. Accordingly, the throughput for this example pipeline can be 1 instruction completing every cycle.

Viewing FIGS. 3G and 3H together, cycles 1-4 may represent the operation of IFU 304G, for example. In FIG. 3H, stage or cycle 1 (IPG stage) can include scheduling an instruction from among the different threads (Thread Scheduling 302H). Such thread scheduling can include round-robin, weighted round-robin (WRR), or eager round-robin, for example. Further, an Instruction Pointer (IP) may be generated in the IPG stage. An instruction fetch out of ICU 306G can occur in stages 2 (FET) and 3 (FE2) and can be initiated in instruction Fetch Start 304H in stage 2. In stage 3, Branch Prediction 306H and/or Return Address Stack (RAS) (Jump Register) 310H can be initiated and may complete in stage 4 (DEC). Also in stage 4, the fetched instruction can be returned (Instruction Return 308H). Next, instruction as well as other related information can be passed onto stage 5 and also put in Decoupling buffer 308G.

Stages 5-10 of the example pipeline operation of FIG. 3H can represent the operation of IEU 312G. In stage 5 (REG), the instruction may be decoded and any required register lookup (Register Lookup 314H) completed. Also in stage 5, hazard detection logic (LD-Use Hazard 316H) can determine whether a stall is needed. If a stall is needed, the hazard detection logic can send a signal to Decouple buffer 308G to replay the instruction (e.g., Decoupling/Replay 312H). However, if no such replay is signaled, the instruction may instead be taken out of Decoupling buffer 308G. Further, in some situations, such as where a hazard/dependency is due to a pending long-latency operation (e.g., a data-cache miss), the thread may not be replayed, but rather put to sleep. In stage 6 (EXE), the instruction may be "executed," which may, for example, include an ALU/Shift and/or other operations (e.g., ALU/Shift/OP 318H). In stage 7 (MEM), a data memory operation can be initiated and an outcome of the branch can be resolved (Branch Resolution 320H). Further, the data, memory lookup may extend to span stages 7, 8 (RTN), and 9 (RT2), and the load data can be returned (Load Return 322H) by stage 9 (RT2). In stage 10 (WRB), the instruction can be committed, or retired and all associated registers can be finally updated for the particular instruction.

In general, the architecture is designed such that there are no stalls in the pipeline. This approach was taken, for both ease of implementation as well as increased frequency of operation. However, there are some situations where a pipeline stall or stop is required. In such situations, Decoupling buffer 308G, which can be considered a functional part of IFU 304G, can allow for a restart or "replay" from a stop point instead of having to flush the entire pipeline and start the thread over to effect the stall. A signal can be provided by IFU 304G to Decoupling buffer 308G to indicate that a stall is needed, for example. In one embodiment, Decoupling buffer 308G can act as a queue for instructions whereby each instruction obtained by IFU 304G also goes to Decoupling buffer 308G. In such a queue, instructions may be scheduled out of order based on the particular thread scheduling, as discussed above. In the event of a signal to Decoupling buffer 308G that a stall is requested, those instructions after the "stop" point can be re-threaded. On the other hand, if no stall is requested, instructions can simply be taken out of the decoupling buffer and the pipeline continued. Accordingly, without a stall, Decoupling buffer 308G can behave essentially like a first-in first-out (FIFO) buffer. However, if one of several threads requests a stall, the others can proceed through the buffer and they may not be held up.

As another aspect of embodiments of the invention, a translation-lookaside buffer (TLB) can be managed as part of a memory management unit (MMU), such as MMU 310G of FIG. 3G. This can include separate, as well as common, TLB allocation across multiple threads. The 128-entry TLB can include a 64-entry joint main TLB and two 32-entry micro TLBs, one each for the instruction and the data side. When a translation cannot be satisfied by accessing the relevant micro TLB, a request may be sent to the main TLB. An interrupt or trap may occur if the main TLB also does not contain the desired entry.

In order to maintain compliance with the MIPS architecture, the main TLB can support paired entries (e.g., a pair of consecutive virtual pages mapped to different physical pages), variable page sizes (e.g., 4K to 256M), and software management via TLB read/write instructions. To support multiple threads, entries in the micro TLB and in the main TLB may be tagged with the thread ID (TID) of the thread that installed them. Further, the main TLB can be operated in at least two modes. In a "partitioned" mode, each active thread may be allocated an exclusive subset or portion of the main TLB to install entries and, during translation, each thread only sees entries belonging to itself. In "global" mode, any thread may allocate entries in any portion of the main TLB and all entries may be visible to all threads. A "de-map" mechanism can be used during main TLB writes to ensure that overlapping translations are not introduced by different threads.

Entries in each micro TLB can be allocated using a not-recently-used (NRU) algorithm, as one example. Regardless of the mode, threads may allocate entries in any part of the micro TLB. However, translation in the micro TLB may be affected by mode. In global mode, all micro TLB entries may be visible to all threads, but in partitioned mode, each thread may only see its own entries. Further, because the main TLB can support a maximum of one translation per cycle, an arbitration mechanism may be used to ensure that micro TLB "miss" requests from all threads are serviced fairly.

In a standard MIPS architecture, unmapped regions of the address space follow the convention that the physical address equals the virtual address. However, according to embodiments of the invention, this restriction is lifted and unmapped regions can undergo virtual-to-physical mappings through the micro TLB/main TLB hierarchy while operating in a "virtual-MIPS" mode. This approach allows a user to isolate unmapped regions of different threads from one another. As a byproduct of this approach, however, the normal MIPS convention that main TLB entries containing an unmapped address in their virtual page number (VPN2) field can be considered invalid is violated. In one embodiment of the invention, this capability can be restored to the user whereby each entry in the main TLB can include a special "master valid" bit that may only be visible to the user in the virtual MIPS-mode. For example, an invalid entry can be denoted by a master valid bit value of "0" and a valid entry can be denoted by a master valid bit value of "1."

As another aspect of the invention, the system can support out-of-order load/store scheduling in an in-order pipeline. As an example implementation, there can be a user-programmable relaxed memory ordering model so as to maximize overall performance. In one embodiment, the ordering can be changed by user programming to go from a strongly ordered model to a weakly ordered model. The system can support four types: (i) Load-Load Re-ordering; (ii) Load-Store Re-ordering; (ii) Store-Store Re-ordering; and (iv) Store-Load Re-ordering. Each type of ordering can be independently relaxed by way of a bit vector in a register. If each type is set to the relaxed state, a weakly ordered model can be achieved.

Figure 3I:
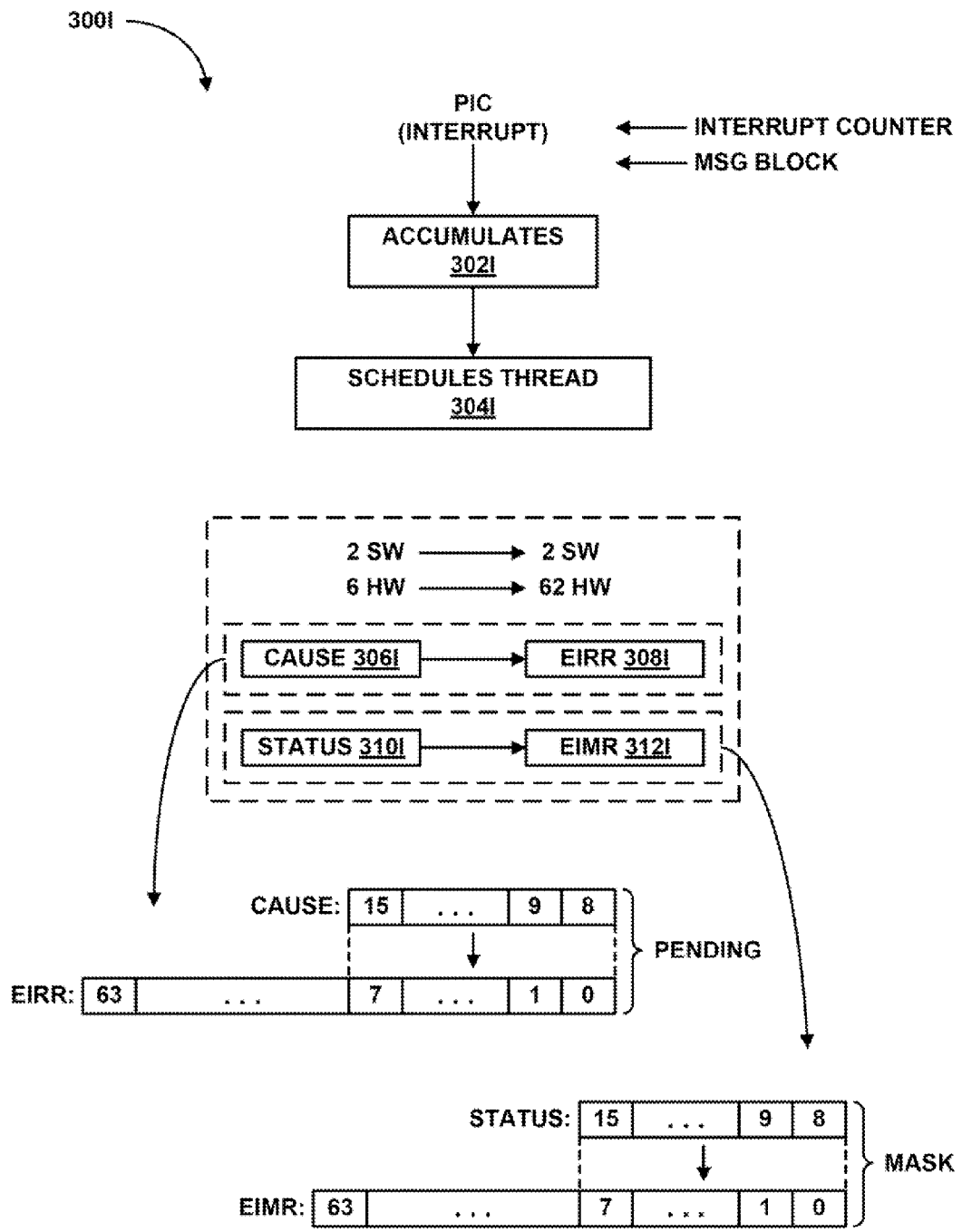
FIG. 3I illustrates a core interrupt flow operation within a processor according to an embodiment of the invention.

Referring now to FIG. 3I, a core interrupt flow operation within a processor according to an embodiment of the invention is shown and indicated by the general reference character 300I. Programmable Interrupt Controller (PIC), as will be discussed in more detail below with reference to FIG. 3J, may provide an interrupt including Interrupt Counter and MSG Block to Accumulates 302I. Accordingly, operation 300I can occur within any of the processors or cores of the overall system. Functional block Schedules Thread 304I can receive control interface from block 302I. Extensions to the MIPS architecture can be realized by shadow mappings that can include Cause 306I to EIRR 308I as well as Status 310I to EIMR 312I. The MPS architecture generally only provides 2 bits for software interrupts and 6 bits for hardware interrupts for each of designated status and cause registers. This MIPS instruction architecture compatibility can be retained while providing extensions, according to embodiments of the invention.

As shown in more detail in FIG. 3I, a shadow map ping for Cause 306I to EIRR 308I for an interrupt pending cart include bits 8-15 of the Cause 306I register mapping to bits 0-7 of EIRR 308I. Also, a software interrupt can remain within a core, as opposed to going through the PIC, and can be enacted by writing to bits 8 and/or 9 of Cause 306I. The remaining 6 bits of Cause 306I can be used for hardware interrupts. Similarly, a shadow mapping for Status 310I to EIMR 312I for a mask can include bits 8-15 of the Status 310I register mapping to bits 0-7 of EIMR 312I. Further, a software interrupt can be enacted by writing to bits 8 and/or 9 of Status 310I while the remaining 6 bits can be used for hardware interrupts. In this fashion, the register extensions according to embodiments of the invention can provide much more flexibility in dealing with interrupts. In one embodiment, interrupts can also be conveyed via the non-shadowed bits 8-63 of EIRR 308I and/or bits 8-63 of EIMR 312I.

Figure 3J:
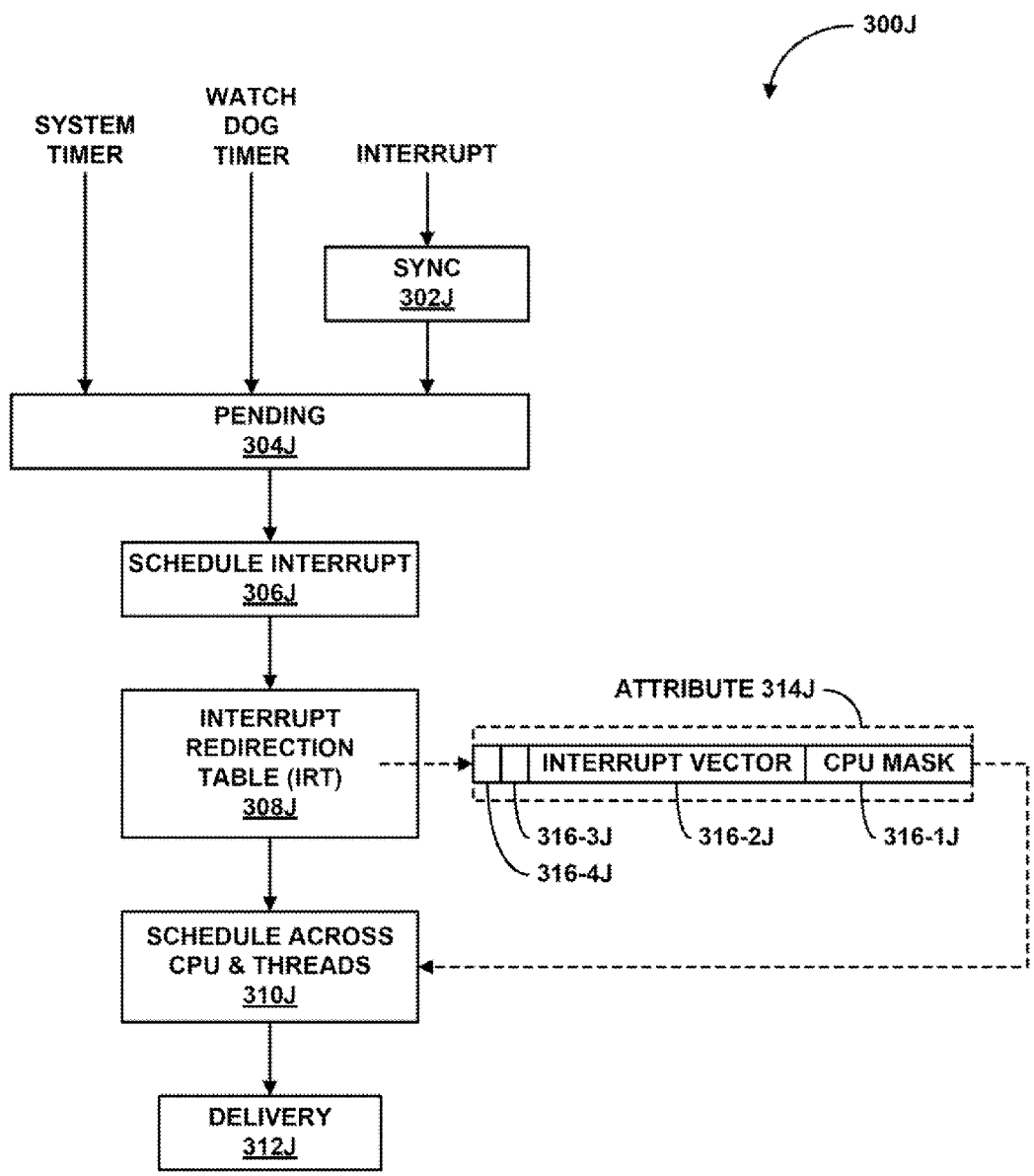
FIG. 3J illustrates a programmable interrupt controller (PIC) operation according to an embodiment of the invention.

Referring now to FIG. 3J, a PIC operation according to an embodiment of the invention is shown and indicated by the general reference character 300J. For example, flow 300J may be included in an implementation of box 226 of FIG. 2A. In FIG. 3J, Sync 302J can receive an interrupt indication and provide a control input to Pending 304J control block. Pending 304J, which can effectively act as an interrupt gateway, can also receive system timer and watch dog timer indications. Schedule Interrupt 306J can receive an input from Pending 304J. Interrupt Redirection Table (IRT) 308J can receive an input from Schedule Interrupt 306J.

Each interrupt and/or entry of IRT 308J can include associated attributes (e.g., Attribute 314J) for the interrupt, as shown. Attribute 314J can include CPU Mask 316-1J, Interrupt Vector 316-2J, as well as fields 316-3J and 316-4J, for examples. Interrupt Vector 316-2J can be a 6-bit field that designates a priority for the interrupt. In one embodiment, a lower number in Interrupt Vector 316-2J can indicate a higher priority for the associated interrupt via a mapping to EIPR 308I, as discussed above with reference to FIG. 3I. In FIG. 3J, Schedule across CPU & Threads 310J can receive an input from block 308J, such as information from Attribute 314J. In particular, CPU Mask 316-1J may be used to indicate to which of the CPUs or cores the interrupt is to be delivered. Delivery 312J block can receive an input from block 310J In addition to the PIC, each of 32 threads, for example, may contain a 64-bit interrupt vector. The PIC may receive interrupts or requests from agents and then deliver them to the appropriate thread. As one example implementation, this control may be software programmable. Accordingly, software control may elect to redirect all external type interrupts to one or more threads by programming the appropriate PIC control registers. Similarly, the PIC may receive an interrupt event or indication from the PCI-X interface (e.g., PCI-X 234 of FIG. 2A), which may in turn be redirected to a specific thread of a processor core. Further, an interrupt redirection table (e.g., IRT 308J of FIG. 3J) may describe the identification of events (e.g., an interrupt indication) received by the PIC as well as information related to its direction to one or more "agents." The events can be redirected to a specific core by using a core mask, which can be set by software to specify the vector number that may be used to deliver the event to a designated recipient. An advantage of this approach is that it allows the software to identify the source of the interrupt without polling.

In the case where multiple recipients are programmed for a given event or interrupt, the PIC scheduler can be programmed to use a global "round-robin" scheme or a per-interrupt-based local round-robin scheme for event delivery. For example, if threads 5, 14, and 27 are programmed to receive external interrupts, the PIC scheduler may deliver the first external interrupt to thread 5, the next one to thread 14, the next one to thread 27, then return to thread 5 for the next interrupt, and so on.

In addition, the PIC also may allow any thread to interrupt any other thread (i.e., an inter-thread interrupt). This can be supported by performing a store (i.e., a write operation) to the PIC address space. The value that can be used for such a write operation can specify the interrupt vector and the target thread to be used by the PIC for the inter-thread interrupt. Software control can then use standard conventions to identify the inter-thread interrupts. As one example, a vector range may be reserved for this purpose.

As discussed above with reference to FIGS. 3G and 3H, each core can include a pipeline decoupling buffer (e.g., Decoupling 308G of FIG. 3G). In one aspect of embodiments of the invention, resource usage in an in-order pipeline with multiple threads can be maximized. Accordingly, the decoupling buffer is "thread aware" in that, threads not requesting a stall can be allowed to flow through without stopping. In this fashion, the pipeline decoupling buffer can re-order previously scheduled threads. As discussed above, the thread scheduling can only occur at the beginning of a pipeline. Of course, re-ordering of instructions within a given thread is not normally performed by the decoupling buffer, but rather independent threads can incur no penalty because they can be allowed to effectively bypass the decoupling buffer while a stalled thread is held-up.

In one embodiment of the invention, a 3-cycle cache can be used in the core implementation. Such a 3-cycle cache can be an "off-the-shelf" cell library cache, as opposed to a specially-designed cache, in order to reduce system costs. As a result, there may be a gap of three cycles between the load and the use of a piece of data and/or an instruction. The decoupling buffer can effectively operate in and take advantage of this 3-cycle delay. For example, if there was only a single thread, a 3-cycle latency would be incurred. However, where four threads are accommodated, intervening slots can be taken up by the other threads. Further, branch prediction can also be supported. For branches correctly predicted, but not taken, there is no penalty. For branches correctly predicted and taken, there is a one-cycle "bubble" or penalty. For a missed prediction, there is a 5-cycle bubble, but such a penalty can be vastly reduced where four threads are operating because the bubbles can simply be taken up by the other threads. For example, instead of a 5-cycle bubble, each of the four threads can take up one so that only a single bubble penalty effectively remains.

As discussed above with reference to FIGS. 3D, 3E, and 3F, instruction scheduling schemes according to embodiments of the invention can include eager round-robin scheduling (ERRS), fixed number of cycles per thread, and multithreaded fixed-cycle with ERRS. Further, the particular mechanism for activating threads in the presence of conflicts can include the use of a scoreboard mechanism, which can track long latency operations, such as memory access, multiply, and/or divide operations.

Figure 3K:
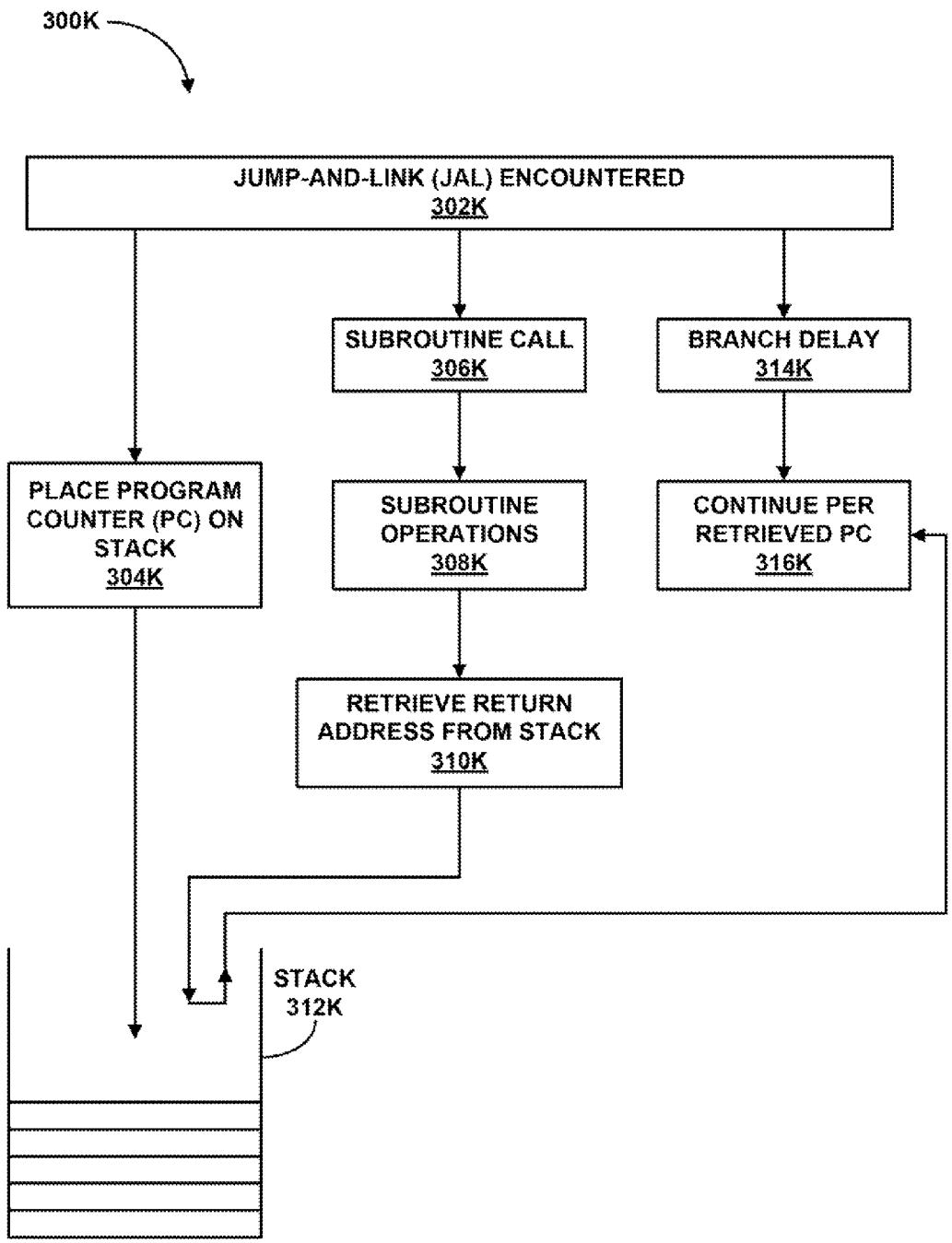
FIG. 3K illustrates a return address stack (RAS) operation for multiple thread allocation according to an embodiment of the invention.

Referring now to FIG. 3K, a return address stack (RAS) operation for multiple thread allocation is shown and indicated by the general reference character 300K. This operation can be implemented in IFU 304G of FIG. 3G and as also indicated in operation 310H of FIG. 3H, for example. Among the instructions supported in embodiments of the invention are: (i) a branch instruction where a prediction is whether it is taken or not taken and the target is known; (ii) a jump instruction where it is always taken and the target is known; and (iii) a jump register where it is always taken and the target is retrieved from a register and/or a stack having unknown contents.

In the example operation of FIG. 3K, a Jump-And-Link (JAL) instruction can be encountered (302K) to initiate the operation. In response to the JAL, the program counter (PC) can be placed on the return address stack (RAS) (304K). An example RAS is shown as Stack 312K and, in one embodiment, Stack 312K is a first-in last-out (FILO) type of stack to accommodate nested subroutine calls. Substantially in parallel with placing the PC on Stack 312K, a subroutine call can be made (306K). Various operations associated with the subroutine instructions can then occur (308K). Once the subroutine flow is complete, the return address can be retrieved from Stack 312K (310K) and the main program can continue (316K) following any branch delay (314K).

For multiple thread operation, Stack 312K can be partitioned so that entries are dynamically configured across a number of threads. The partitions can change to accommodate the number of active threads. Accordingly, if only one thread is in use, the entire set of entries allocated for Stack 312K can be used for that thread. However, if multiple threads are active, the entries of Stack 312K can be dynamically configured to accommodate the threads so as to utilize the available space of Stack 312K efficiently.

In a conventional multiprocessor environment, interrupts are typically given to different CPUs for processing on a round-robin basis or by designation of a particular CPU for the handling of interrupts. However, in accordance with embodiments of the invention, PIC 226 of FIG. 2A, with operation shown in more detail in FIG. 3J, may have the ability to load balance and redirect interrupts across multiple CPUs/cores and threads in a multithreaded machine. As discussed above with reference to FIG. 3J, IRT 308J can include attributes for each interrupt, as shown in Attribute 314J. CPU Mask 316-1J can be used to facilitate load balancing by allowing for certain CPUs and/or threads to be masked out of the interrupt handling. In one embodiment, CPU Mask may be 32-bits wide to allow for any combination of 8 cores, each having 4 threads, to be masked. As an example, Core-2 210c and Core-7 210h of FIG. 2A may be intended to be high availability processors, so CPU Mask 316-1 J of FIG. 3J may have its corresponding bits set to "1" for each interrupt in IRT 308J so as to disallow any interrupt processing on Core-2 or Core-7.

Further, for both CPUs/cores as well as threads, a round-robin scheme (e.g., by way of a pointer) can be employed among those cores and/or threads that are not masked for a particular interrupt. In this fashion, maximum programmable flexibility is allowed for interrupt load balancing. Accordingly, operation 300J of FIG. 3J allows for two levels of interrupt scheduling: (i) the scheduling of 306J, as discussed above; and (ii) the load balancing approach including CPU/core and thread masking.

As another aspect of embodiments of the invention, thread-to-thread interrupting is allowed whereby one thread can interrupt another thread. Such thread-to-thread interrupting may be used for synchronization of different threads, as is common for telecommunications applications. Also, such thread-to-thread interrupting may not go through any scheduling according to embodiments of the invention.

C. Data Switch and L2 Cache

Returning now to FIG. 2A, the exemplary processor may further include a number of components that promote high performance, including: an 8-way set associative on-chip level-2 (L2) cache (2 MB); a cache coherent Hyper Transport interface (768 Gbps); hardware accelerated Quality-of-Service (QOS) and classification; security hardware acceleration—AES, DES/3DES, SHA-1, MD5, and RSA; packet ordering support; string processing support; TOE hardware (TCP Offload Engine); and numerous IO signals, in one aspect of an embodiment of the invention, data switch interconnect 216 may be coupled to each of the processor cores 210a-h by its respective data cache 212a-h. Also, the messaging network 222 may be coupled to each of the processor cores 210a-h by its respective instruction cache 214a-h. Further, in one aspect of an embodiment of the invention, the advanced telecommunications processor can also include an L2 cache 208 coupled to the data switch interconnect and configured to store information accessible to the processor cores 210a-h. In the exemplary embodiment, the L2 cache includes the same number of sections (sometimes referred to as banks) as the number of processor cores. This example is described with reference to FIG. 4A, but it is also possible to use more or fewer L2 cache sections.

As previously discussed, embodiments of the invention may include the maintenance of cache coherency using MOSI (Modified, Own, Shared, Invalid) protocol. The addition of the "Own" state enhances the "MSI" protocol by allowing the sharing of dirty cache lines across process cores. In particular, an example embodiment, of the invention may present a fully coherent view of the memory to software that may be running on up to 32 hardware contexts of 8 processor cores as well as the I/O devices. The MOSI protocol may be used throughout the L1 and L2 cache (e.g., 212a-h and 208, respectively, of FIG. 2A) hierarchy. Further, all external references (e.g., those initiated by an I/O device) may snoop the L1 and L2 caches to ensure coherency and consistency of data. In one embodiment, as will be discussed in more detail below, a ring-based approach may be used to implement cache coherency in a multiprocessing system. In general, only one "node" may be the owner for a piece of data in order to maintain coherency.

According to one aspect of embodiments of the invention, an L2 cache (e.g., cache 208 of FIG. 2A) may be a 2 MB, 8-way set-associative unified (i.e., instruction and data) cache with a 32 B line size. Further, up to 8 simultaneous references can be accepted by the L2 cache per cycle. The L2 arrays may run at about half the rate of the core clock, but the arrays can be pipelined to allow a request to be accepted by all banks every core clock with a latency of about 2 core clocks through the arrays. Also, the L2 cache design can be "non-inclusive" of the L1 caches so that the overall memory capacity can be effectively increased.

As to ECC protection for an L2 cache implementation, both cache data and cache tag arrays can be protected by SECDED (Single Error Correction Double Error Detection) error protecting codes. Accordingly, all single bit errors are corrected without software intervention. Also, when uncorrectable errors are detected, they can be passed to the software as code-error exceptions whenever the cache line is modified. In one embodiment, as will be discussed in more detail below, each L2 cache may act like any other "agent" on a ring of components.

According to another aspect of embodiments of the invention, "bridges" on a data movement ring may be used for optimal redirection of memory and I/O traffic. Super Memory I/O Bridge 206 and Memory Bridge 218 of FIG. 2A may be separate physical structures, but they may be conceptually the same. The bridges can be the main gatekeepers for main memory and I/O accesses, for example. Further, in one embodiment, the I/O can be memory-mapped.

Figure 4A:
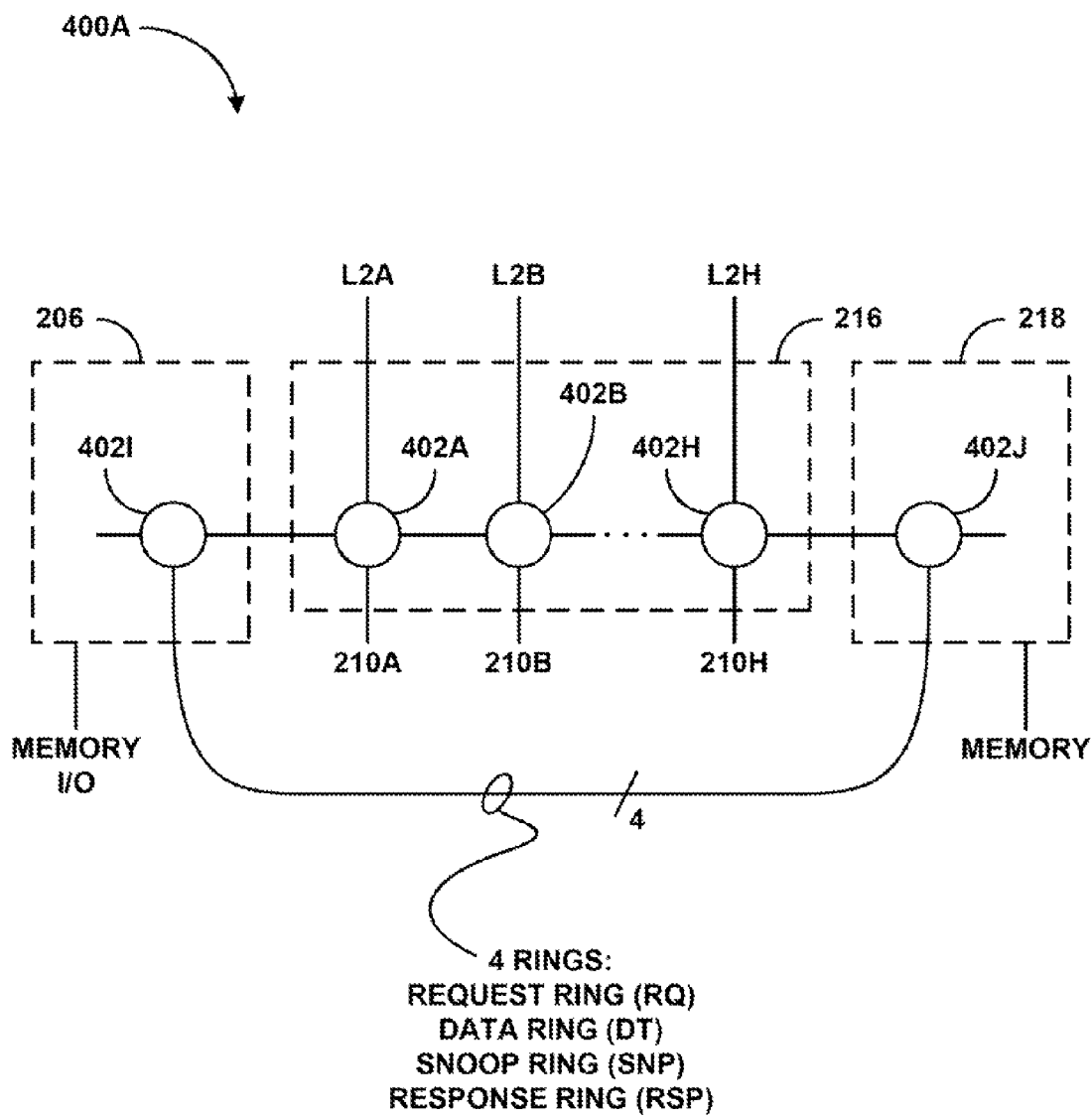
FIG. 4A illustrates a data switch interconnect (DSI) ring arrangement according to an embodiment of the invention.

Referring now to FIG. 4A, a data switch interconnect (DSI) ring arrangement according to an embodiment of the invention is shown and indicated by the general reference character 400A. Such a ring arrangement can be an implementation of DSI 216 along with Super Memory I/O Bridge 206 and Memory Bridge 218 of FIG. 2A. In FIG. 4A, Bridge 206 can allow an interface between memory & I/O and the rest of the ring. Ring elements 402a-j each correspond to one of the cores 210a-h and the memory bridges of FIG. 2A. Accordingly, element 402a interfaces to L2 cache L2 a and Core-0 210a, and element 402b interfaces to L2 b and Core 210b, and so on through 402h interfacing to L2 h and Core 210h. Bridge 206 includes an element 402on the ring and bridge 218 includes an element 402j on the ring.

As shown in FIG. 4A, four rings can make up the ring structure in an example embodiment; Request Ring (RQ), Data Ring (DT), Snoop Ring (SNP), and Response Ring (RSP). The communication on the rings is packet based communication. An exemplary RQ ring-packet includes destination ID, transaction ID, address, request type (e.g., RD, RD.sub.13EX, WR, UPG), valid bit, cacheable indication, and a byte enable, for example. An exemplary DT ring packet includes destination ID, transaction ID, data, status (e.g., error indication), and a valid bit, for example. An exemplary SNP ring packet includes destination ID, valid bit, CPU snoop response (e.g., clean, shared, or dirty indication), L2 snoop response, bridge snoop response, retry (for each of CPU, bridge, and L2), AERR (e.g., illegal request, request parity), and a transaction ID, for example. An exemplary RSP ring packet includes all the fields of SNP, but may represent a "final" status, as opposed to the "in-progress" status of the RSP ring.

Figure 4B:
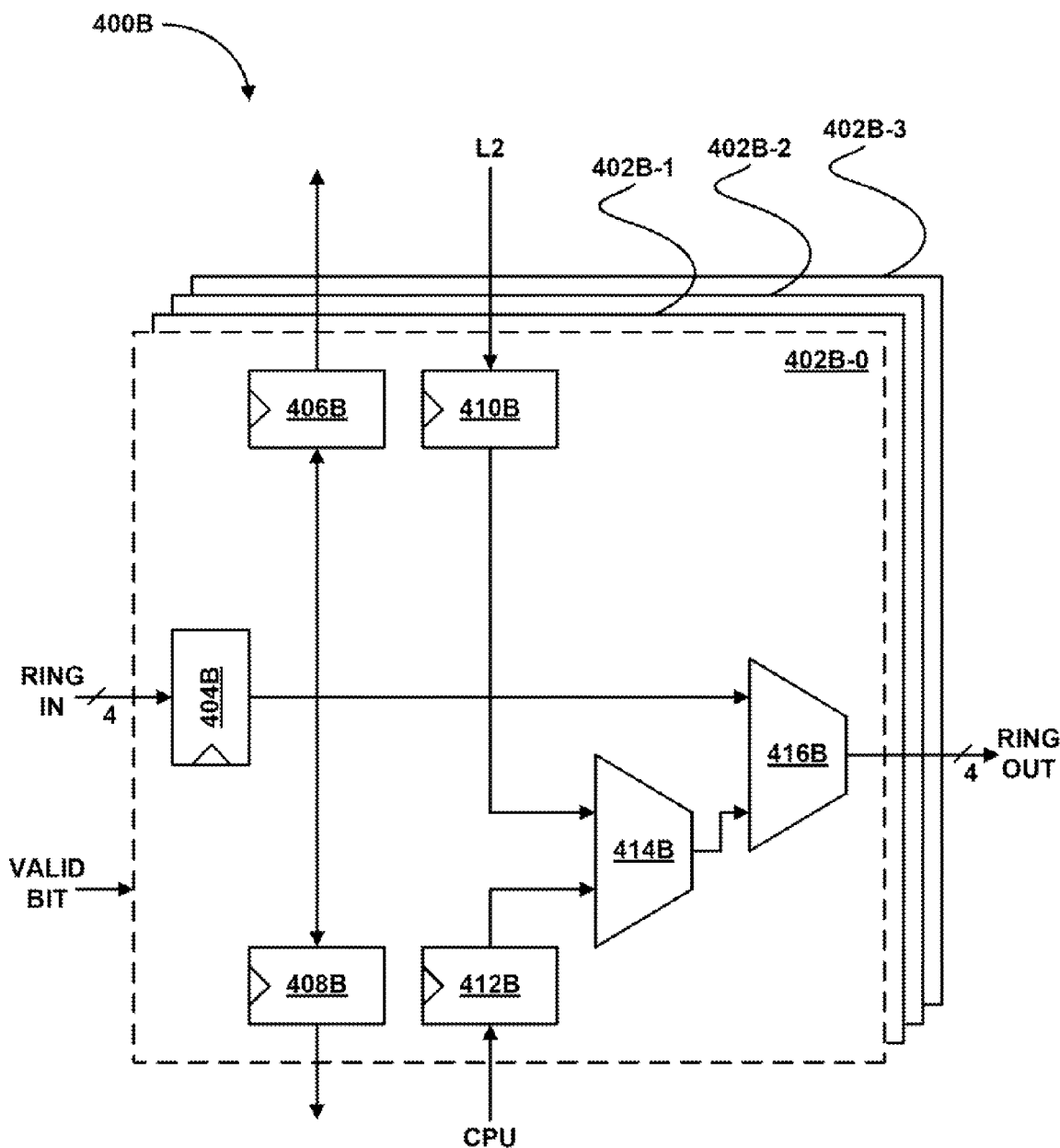
FIG. 4B illustrates a DSI ring component according to an embodiment of the invention.

Referring now to FIG. 4B, a DSI ring component according to an embodiment of the invention is shown and indicated by the general reference character 400B. Ring component 402b-0 may correspond to one of the four rings RQ, DT, SNP, or RSP, in one embodiment. Similarly, ring components 402b-1, 402b-2, and 402b-3 may each correspond to one of the four rings. As an example, a "node" can be formed by the summation of ring components 402b-0, 402b-1, 402b-2, and 402b-3.

Incoming data or "Ring In" can be received in flip-flop 404B. An output of flip-flop 404B can connect to flip-flops 406B and 408B as sell as multiplexer 416B. Outputs of flip-flops 406B and 408B can be used for local data use. Flip-flop 410B can receive an input from the associated L2 cache while flip-flop 412B can receive an input from the associated CPU. Outputs from flip-flops 410B and 412B can connect to multiplexer 414B. An output of multiplexer 414B can connect to multiplexer 416B and an output of multiplexer 416B can connect to outgoing data or "Ring Out." Also, ring component 402b-0 can receive a valid bit signal.

Generally, higher priority data received on Ring In will be selected by multiplexer 416B if the data is valid (e.g., Valid Bit="1"). If not, the data can be selected from either the L2 or the CPU via multiplexer 414B. Further, in this example, if data received on Ring In is intended for the local node, flip-flops 406B and/or 408B can pass the data onto the local core instead of allowing the data to pass all the way around the ring before receiving it again.

Figure 4C:
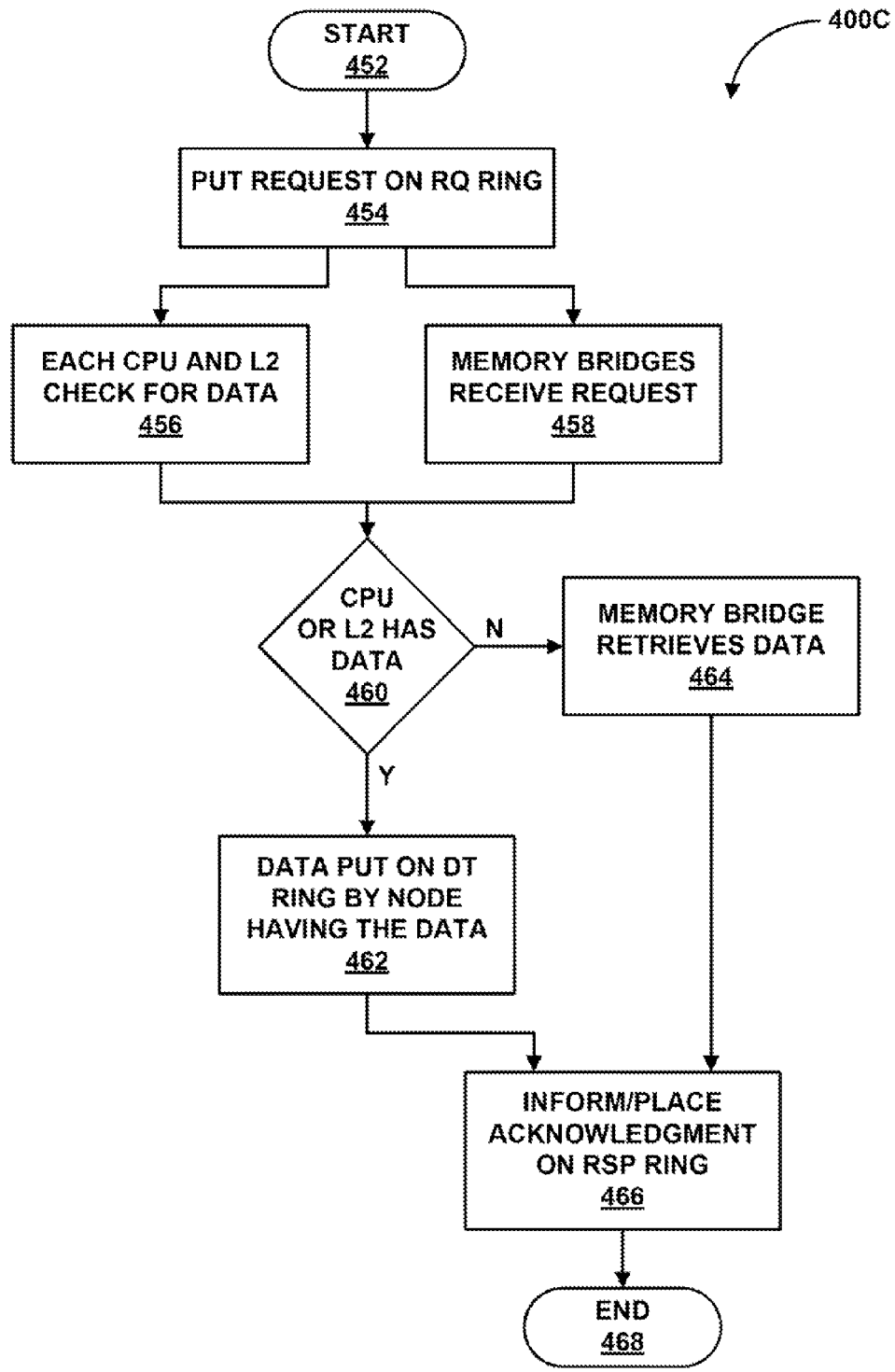
FIG. 4C illustrates a flow diagram of an example data retrieval in the DSI according to an embodiment of the invention.

Referring now to FIG. 4C, a flow diagram of an example data retrieval in the DSI according to an embodiment of the invention is shown and indicated by the general reference character 400C. The flow can begin in Start 452 and a request can be placed on the request ring (RQ) (454). Each CPU and L2 in the ring structure can check for the requested data (456). Also, the request can be received in each memory bridge attached to the ring (458). If any CPU or L2 has the requested data (460), the data can be put on the data ring (DT) by the node having the data (462). If no CPU or L2 has found the requested data (460), the data can be retrieved by one of the memory bridges (464). An acknowledgement can be placed on the snoop ring (SNP) and/or the response ring (RSP) by either the node that found the data or the memory bridge (466) and the flow can complete in End (468). In one embodiment, the acknowledgement by the memory bridge to the SNP and/or RSP ring may be implied.

In an alternative embodiment, the memory bridge would not have to wait for an indication that the data has not been found in any of the L2 caches in order to initiate the memory request. Rather, the memory request (e.g., to DRAM), may be speculatively issued. In this approach, if the data is found prior to the response from the DRAM, the later response can be discarded. The speculative DRAM accesses can help to mitigate the effects of the relatively long memory latencies.

D. Message Passing Network

Also in FIG. 2A, in one aspect of an embodiment of the invention, the advanced telecommunications processor can include Interface Switch Interconnect (ISI) 224 coupled to the messaging network 222 and a group of communication ports 240a-f, and configured to pass information among the messaging network 222 and the communication ports 240a-f.

Figure 5A:
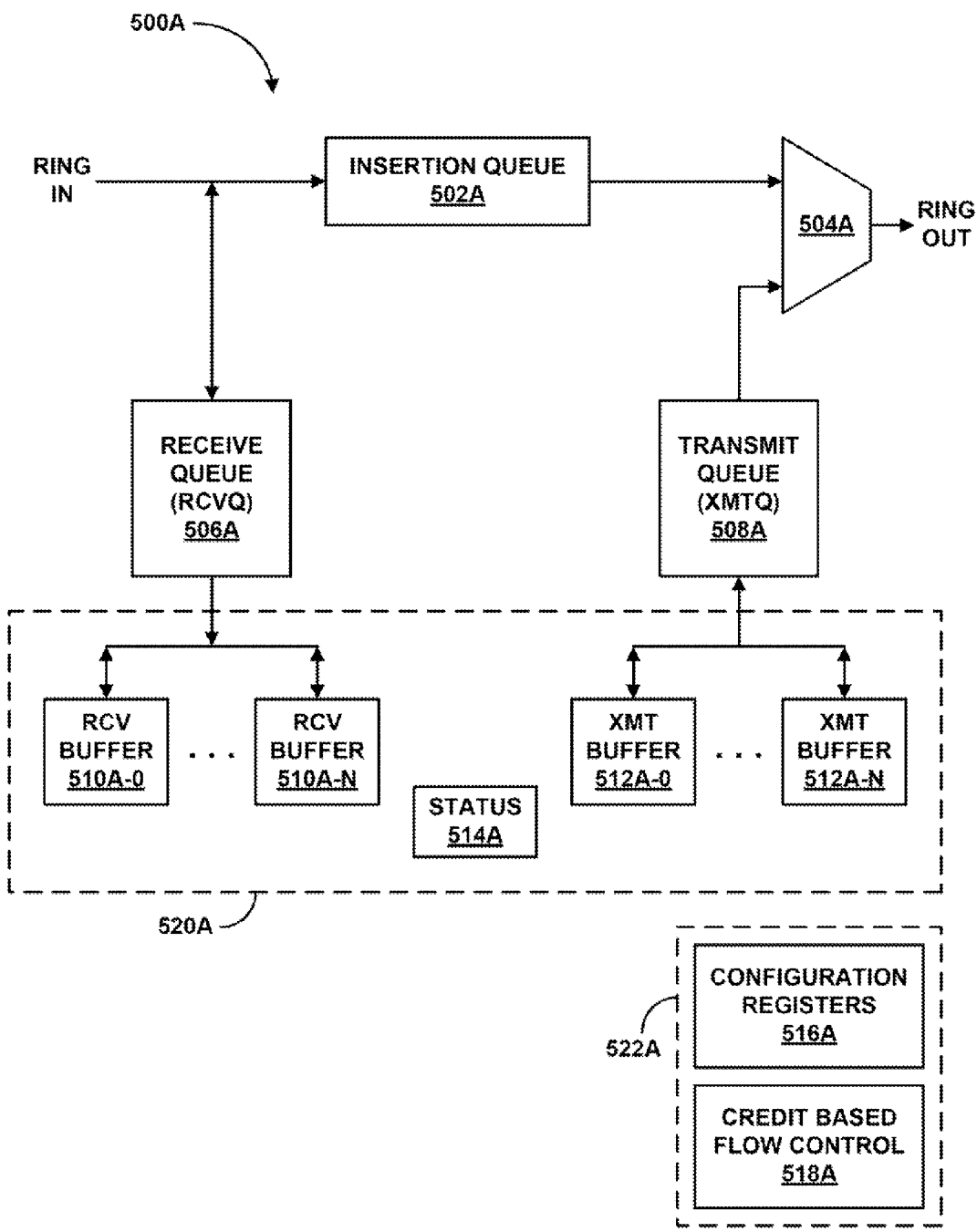
FIG. 5A illustrates a fast messaging ring component according to an embodiment of the invention.

Referring now to FIG. 5A, a fast messaging ring component or station according to an embodiment of the invention is shown and indicated by the general reference character 500A. An associated ring structure may accommodate point-to-point messages as an extension of the MIPS architecture, for example. The "Ring In" signal can connect to both Insertion Queue 502A and Receive Queue (RCVQ) 506A. The insertion queue can also connect to multiplexer 504A, the output of which can be "Ring Out." The insertion queue always gets priority so that the ring does not get backed-up. Associated registers for the CPU core are shown in dashed boxes 520A and 522A. Within box 520A, buffers RCV Buffer 510A-0 through RCV Buffer 510A-N can interface with RCVQ 506A. A second input to multiplexer 504A can connect to Transmit Queue (XMTQ) 508A. Also within box 520A, buffers XMT Buffer 512A-0 through XMT Buffer 512A-N can interface with XMTQ 508A. Status 514A registers can also be found in box 520A. Within dashed box 522A, memory-mapped Configuration Registers 516A and Credit Based Flow Control 518A can be found.

Figure 5B:
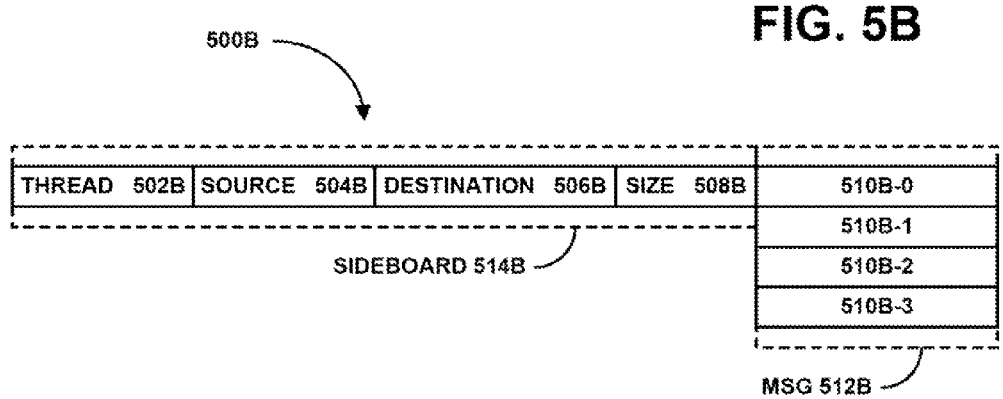
FIG. 5B illustrates a message data structure for the system of FIG. 5A.

Referring now to FIG. 5B, a message data structure for the system of FIG. 5A is shown and indicated by the general reference character 500B. Identification fields may include Thread 502B, Source 504B, and Destination 508B. Also, there can be a message size indicator Size 508B. The identification fields and the message size indicator can form Sideboard 514B. The message or data to be sent itself (e.g., MSG 512B) can include several portions, such as 510B-0, 510B-1, 510B-2, and 510B-3. According to embodiments, the messages may be atomic so that the full message cannot be interrupted.

The credit-based flow control can provide a mechanism for managing message sending, for example. In one embodiment, the total number of credits assigned to all transmitters for a target/receiver cannot exceed the sum of the number of entries in its receive queue (e.g., RCVQ 506A of FIG. 5A). For example, 256 may be the total number of credits in one embodiment because the size of the RCVQ of each target/receiver may be 256 entries. Generally, software may control the assignment of credits. At boot-up time, for example, each sender/xmitter or participating agent may be assigned some default number of credits. Software may then be free to allocate credits on a per-transmitter basis. For example, each sender/xmitter can have a programmable number of credits set by software for each of the other targets/receivers in the system. However, not all agents in the system may be required to participate as targets/receivers in the distribution of the transmit credits. In one embodiment, Core-0 credits can be programmed for each one of Core-1, Core-2, . . . Core-7, RGMII.sub.130, RGMII.sub.131, XGMII/SPI-4.2.sub.–0, XGMII/SPI-4.2.sub.–1, POD0, POD1, . . . POD4, etc. The Table 1 below shows an example distribution of credits for Core-0 as a receiver:

TABLE 1

| Transmit Agents | Allowed Credits (Total of 256) |
|---|---|
| Core-0 | 0 |
| Core-1 | 32 |
| Core-2 | 32 |
| Core-3 | 32 |
| Core-4 | 0 |
| Core-5 | 32 |
| Core-6 | 32 |
| Core-7 | 32 |
| POD0 | 32 |
| RGMII_0 | 32 |
| All Others | 0 |

In this example, when Core-1 sends a message of size 2 (e.g., 2 64-bit data elements) to Core-0, the Core-1 credit in Core-0 can be decremented by 2 (e.g., from 32 to 30). When Core-0 receives a message, the message can go into the RCVQ of Core-0. Once the message is removed from the RCVQ of Core-0, that message storage space may essentially be freed-up or made available. Core-0 can then send a signal to the sender (e.g., a free credit signal to Core-1) to indicate the amount of space (e.g., 2) additionally available. If Core-1 continues to send messages to Core-0 without corresponding free credit signals from Core-0, eventually the number of credits for Core-1 can go to zero and Core-1 may not be able to send any more messages to Core-0. Only when Core-0 responds with free credit signals could Core-1 send additional messages to Core-0, for example.

Figure 5C:
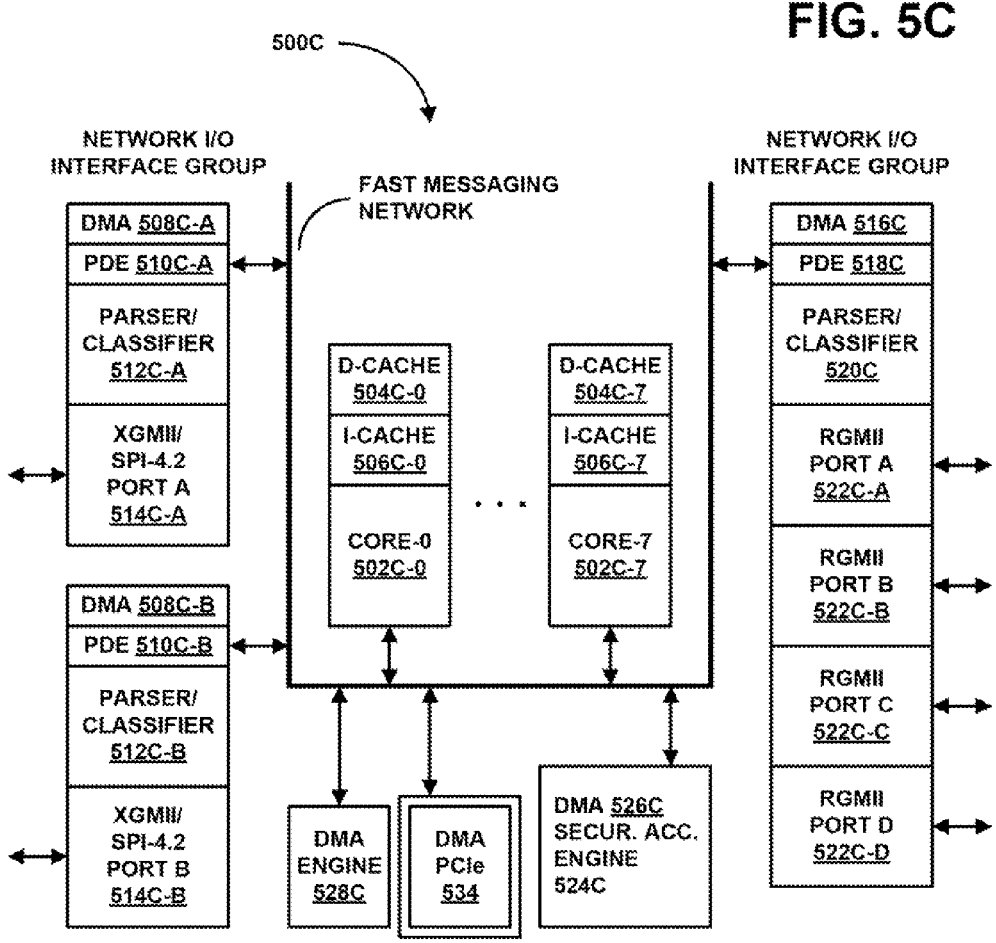
FIG. 5C illustrates a conceptual view of various agents attached to the fast messaging network (FMN) according to an embodiment of the invention.

Referring now to FIG. 5C, a conceptual view of how various agents may be attached to the fast messaging network (FMN) according to an embodiment of the invention is shown and indicated by the general reference character 500C. The eight cores (Core-0 502C-0 through Core-7 502C-7) along with associated data caches (D-cache 504C-0 through 504C-7) and instruction caches (I-cache 506C-0 through 506C-7) can interface to the FMN. Further, Network I/O Interface Groups can also interface to the FMN. Associated with Port A, DMA 508C-A, Parser/Classifier 512C-A, and XGMII/ SPI-4.2 Port A 514C-A can interface to the FMN through Packet Distribution Engine (PDE) 510C-A. Similarly, for Port B, DMA 508C-B, Parser/Classifier 512C-B, and XGMII/SPI-4.2 Port B 514C-B can interface to the FMN through PDE 510C-B. Also, DMA 516C, Parser/Classifier 520C, RGMII Port A 522C-A, RGMII Port B 522C-B, RGMII Port C 522C-C, RGMII Port D 522C-D can interface to the FMN through PDE 518C. Also, Security Acceleration Engine 524C including DMA 526C and DMA Engine 528C can interface to the FMN. PCIe bus 534 can also interface to the FMN and/or the interface switch interconnect (ISI). This interface is shown in more detail in FIGS. 5F through 5I As an aspect of embodiments of the invention, all agents (e.g., cores/threads or networking interfaces, such as shown in FIG. 5C) on the FMN can send a message to any other agent on the FMN. This structure can allow for fast packet movement among the agents, but software can alter the use of the messaging system for any other appropriate purpose by so defining the syntax and semantics of the message container. In any event, each agent on the FMN includes a transmit queue (e.g., 508A) and a receive queue (e.g., 506A), as discussed above with reference to FIG. 5A. Accordingly, messages intended for a particular agent can be dropped into the associated receive queue. All messages originating from a particular agent can be entered into the associated transmit queue and subsequently pushed on the FMN for delivery to the intended recipient.

In another aspect of embodiments of the invention, all threads of the core (e.g., Core-0 502C-0 through Core-7 502C-7 or FIG. 5C) can share the queue resources. In order to ensure fairness in sending out messages, a "round-robin" scheme can be implemented for accepting messages into the transmit queue. This can guarantee that all threads have the ability to send out messages even when one of them is issuing messages at a faster rate. Accordingly, it is possible that a given transmit queue may be full at the time a message is issued. In such a case, all threads can be allowed to queue up one message each inside the core until the transmit queue has room to accept, more messages. As shown in FIG. 5C, the networking interfaces use the PDE to distribute incoming packets to the designated threads. Further, outgoing packets for the networking interfaces can be routed through packet ordering software.

Referring now to FIG. 5D, network traffic in a conventional processing system is shown and indicated by the general reference character 500D. The Packet Input can be received by Packet Distribution 502D and sent for Packet Processing (504D-0 through 504D-3). Packet Sorting/Ordering 506D can receive the outputs from Packet Processing and can provide Packet Output. While such packet-level parallel-processing architectures are inherently suited for networking applications, but an effective architecture must provide efficient support for incoming packet distribution and outgoing packet sorting/ordering to maximize the advantages of parallel packet processing. As shown in FIG. 5D, every packet must go through a single distribution (e.g., 502D) and a single sorting/ordering (e.g., 506D). Both of these operations have a serializing effect on the packet stream so that the overall performance of the system is determined by the slower of these two functions.

Figure 5E:
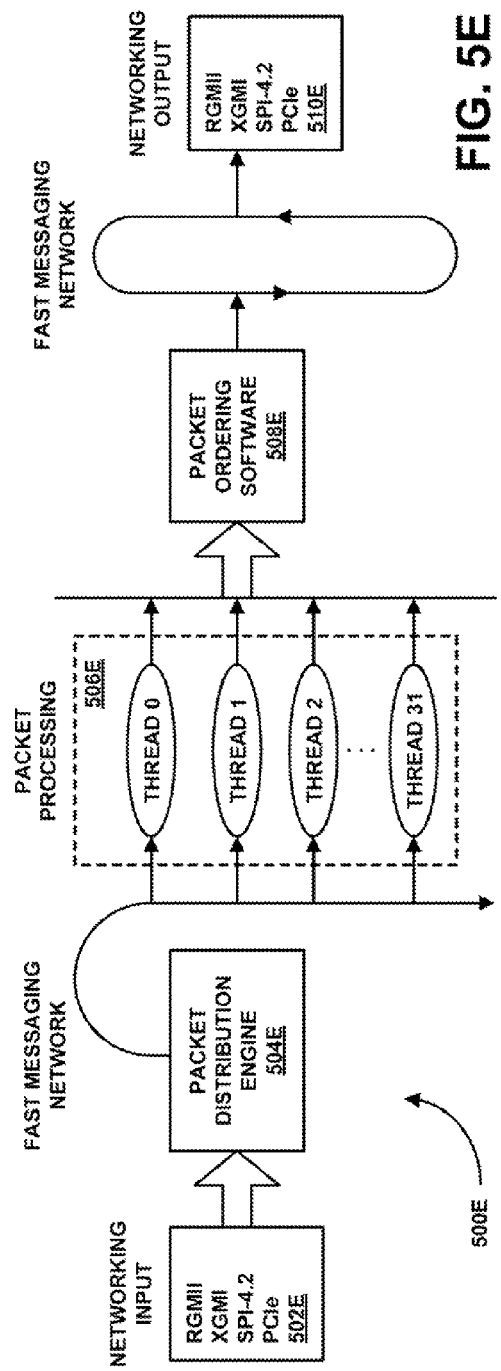
FIG. 5E illustrates packet flow according to an embodiment of the invention.

Referring now to FIG. 5E, a packet flow according to an embodiment of the invention is shown and indicated by the general reference character 500E. This approach provides an extensive (i.e., scalable) high-performance architecture enabling flow of packets through the system. Networking Input 502E can Include RGMII, XGMII, and/or SPI-4.2 and/ or PCIe interface configured ports. After the packets are received, they can be distributed via Packet Distribution Engine (PDE) 504E using the Fast Messaging Network (FMN) to one of the threads for Packet Processing 506E: Thread 0, 1, 2, and so on through Thread 31, for example. The selected thread can perform one or more functions as programmed by the packet header or the pay load and then the packet on to Packet Ordering Software 508E. As an alternative embodiment, a Packet Ordering Device (POD), as shown in box 236 of FIG. 2A, for example, may be used in place of 508E of FIG. 5E. In either implementation, this function sets up the packet ordering and then passes it onto the outgoing network (e.g., Networking Output 510E) via the FMN. Similar to the networking input, the outgoing port can be any one of the configured RGMII, XGMII, or SPI-4.2 interfaces or PCIe bus, for example.

E. Interface Switch

In one aspect of embodiments of the invention, the FMN can interface to each CPU/core, as shown in FIG. 2A. Such FMN-to-core interfacing may include push/pop instructions, waiting for a message instruction, and interrupting on a message arrival. In the conventional MIPS architecture, a co-processor or "COP2" space is allocated. However, according to embodiments of the invention, the space designated for COP2 is instead reserved for messaging use via the FMN. In one embodiment, software executable instructions may include message send (MsgSnd), message load (MsgLd), message-to-COP2 (MTC2), message-from-COP2 (MFC2), and message wait (MsgWait). The MsgSnd and MsgLd instructions can include target information as well as message size indications. The MTC2 and MFC2 instructions can include data transfers from/to local configuration registers, such as Status 514A and registers 522A of FIG. 5A. The MsgWait instruction can include the operation of essentially entering a "sleep" state until a message is available (e.g., interrupting on message arrival).

As another aspect of embodiments of the invention, fast messaging (FMN) ring components can be organized into "buckets." For, example, RCVQ 506A and XMTQ 508A of FIG. 5A may each be partitioned across multiple buckets in similar fashion to the thread concept, as discussed above.

In one aspect of embodiments of the invention, a Packet Distribution Engine (PDE) can include each of the XGMII/ SPI-4.2 interfaces and four RGMII interfaces and PCIe interfaces to enable efficient and load-balanced distribution of incoming packets to the processing threads. Hardware accelerated packet distribution is important for high throughput networking applications. Without the PDE, packet distribution may be handled by software, for example. However, for 64 B packets, only about 20 ns is available for execution of this function on an XGMII type interface. Further, queue pointer management would have to be handled due to the single-producer multiple-consumer situation. Such a software-only solution is simply not able to keep up with the required packet delivery rate, without impacting the performance of the overall system.

According to an embodiment of the invention, the PDE can utilize the Fast Messaging Network (FMN) to quickly distribute packets to the threads designated by software as processing threads. In one embodiment, the PDE can implement a weighted round-robin scheme for distributing packets among the intended recipients. In one implementation, a packet is not actually moved, but rather gets written to memory as the networking interface receives it. The PDE can insert a "Packet Descriptor" in the message and then send it to one of the recipients, as designated by software. This can also mean that not all threads must participate in receiving packets from any given interface.

PCIe Interface

Figure 5F:
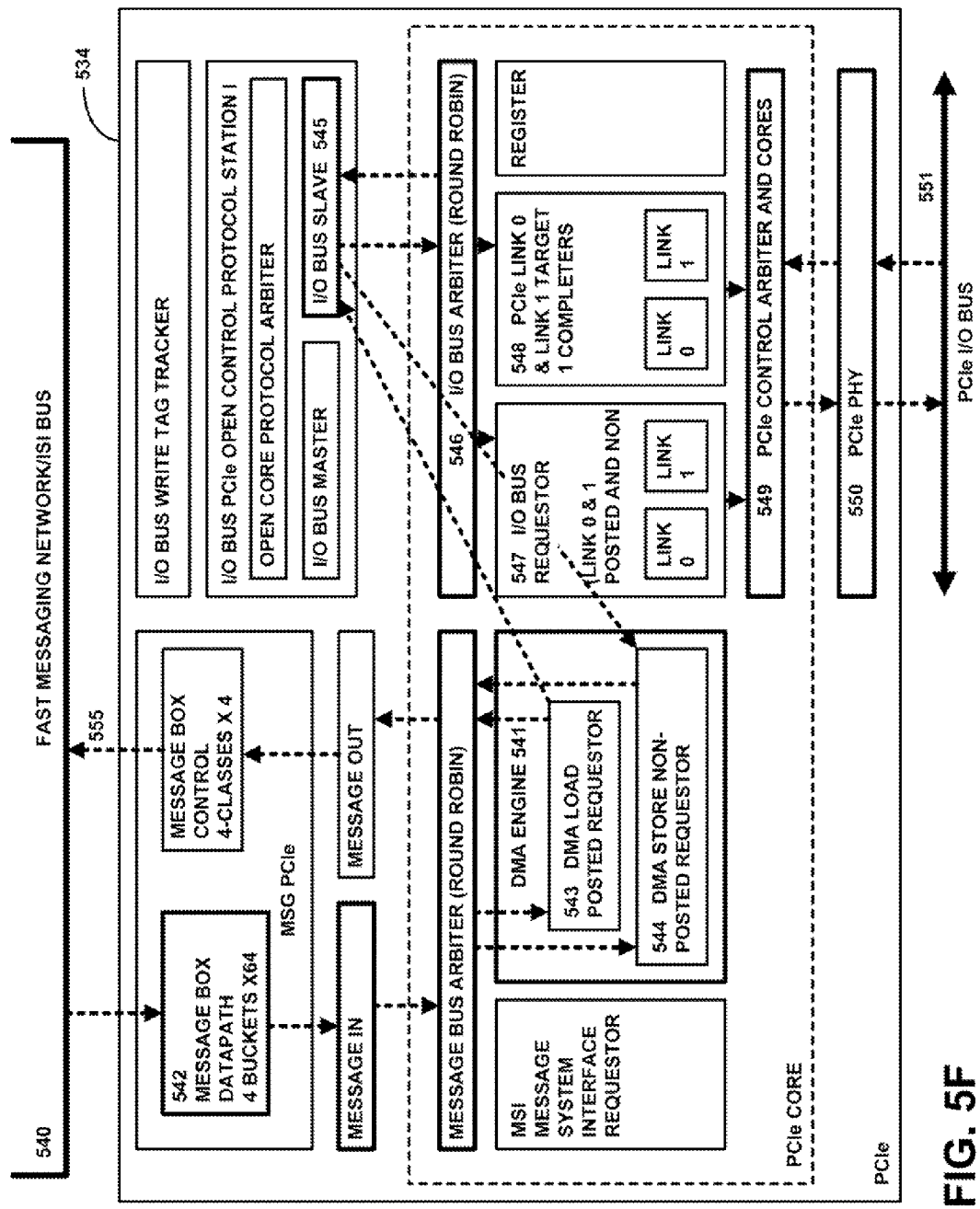
FIG. 5F shows a detailed view of how the PCIe interface connect the FMN/ISI and the PCIe I/O bus.

Referring now to FIG. 5F, 5F shows a close up of the interface between the Fast Messaging Network (FMN) and interface switch interconnect (ISI) (540) and the PCIe interface (534) previously shown in FIG. 2A (234), and FIG. 5C (534). The fast messaging network and/or the interface switch interconnect (540) sends various signals to the PCIe interface to both control the interface, and send and receive data from the interface.

To speed development of such devices, it will usually be advantageous to rely upon pre-designed PCIe components as much as possible. Suitable PCIe digital cores, physical layer (PHY), and verification components may be obtained from different vendors. Typically these components will be purchased as intellectual property and integrated circuit design packages, and these design packages used, in conjunction with customized DMA design software, to design integrated circuit chips capable of interfacing to fast message buses of advanced processors, and in turn interfacing with PCIe bus hardware.

One important design consideration is to streamline (simplify) the PCIe interface and commands as much as possible. This streamlining process keeps the interface both relatively simple and relatively fast, and allows single chip multiple core processors, such as the present invention, to control PCIe devices with relatively small amounts of software and hardware overhead.

As will be discussed, the present design utilizes the Fast messaging network (FMN)/interface switch interconnect in combination with a customized DMA engine (541) embedded as part of the PCIe interface unit (534). The DMA engine essentially serves as a translator between the very different memory storage protocols used by the processor cores and the various PCIe devices. Offloading the translation process to a customized DMA engine greatly reduces the computing demands on the core processors, freeing them up for other tasks.

To briefly review, DMA (Direct Memory Access) circuits allow hardware to access memory independently of the processor core CPUs. The DMA acts to copy memory chunks between devices. Although the CPU initiates this process with an appropriate DMA command, the CPU can then do other things while the DMA executes the memory copy command.

In this embodiment, a customized DMA engine was constructed that accepted the short, the highly optimized, processor FMN and ISI messages as input. The DMA then both translated the FMN/ISI messages into appropriate PCIe-TLP packets (which were then handled by the other PCIe circuitry in the interface), and then automatically handled the original memory copy command requested by the core processors.

Thus the DMA translated the memory copy request into PCIe-TLP packets, and sent it on to the other PCIe circuitry that sends the appropriate commands to the appropriate PCIe device on the PCIe bus via PCIe-TLP packets. After these packets had been sent by the PCIe circuitry, the designated PCIe device completes the task. After the designated PCIe bus device has completed its assigned task, the PCIe bus device would then return appropriate PCIe-TLP packets to the PCIe interface. The PCIe interface DMA accepts these PCIe-TLP packets, and translates them into the appropriate memory copy commands, and otherwise manages the task originally assigned by the processor core without need for further attention from the processor cores. As a result, the processor and the processor cores can now communicate with a broad variety of different PCIe devices with minimal processor core computational overhead.

The processor cores communicate with the PCIe interface via short (1-2 64 bit words) messages sent over the FMN/ISI. The PCIe interface is designed to accept incoming messages that are assigned to four different buckets. Each bucket can have a queue of up to 64 entries per bucket, for a maximum queue dept of 256 messages.

The PCIe interface is also designed to output 4 different classes of messages. These output messages can each be stored in a queue of up to 4 messages per class, for a maximum output queue depth of 16 output messages.

The commands sent from the FMN/ISI to the PCIe interface are as follows:

Message In Buckets

| Name | Bucket | Description |
| --- | --- | --- |
| Link0 DMA Load | 0 | Message to read memory data from I/O Bus Slave interface and write memory data across the PCIe Link0 (also called DMA posted) |
| Link0 DMA Store | 1 | Message to read memory data from the PCIe Link0 and write memory data across the I/O Bus Slave interface (also called DAM non-posted) |
| Link1 DMA Load | 2 | Message to read memory data from I/O Bus Slave interface and write memory data across the PCIe link1 (also called DMA posted) |
| Link1 DMA Store | 3 | Message to read memory data from the PCIe link1 and write memory data across the I/O Bus Slave interface (also called DAM non-posted) |

Most of the communication from the processor cores to the PCIe interface is in the form of simple, terse, 2 64-bit word memory read/write commands. The processor cores will normally assume that these commands have been successfully completed. As a result, the PCIe interface communicates back only terse OK, Not OK, status messages in the form of a very terse single 64-bit word. The various message out classes are shown below:

Message Out Classes

| Name | Class | Description |
| --- | --- | --- |
| Link0 DMA Load | 0 | Return message for Message in Bucket 0 |
| Link0 DMA Store | 1 | Return Message for Message in Bucket 1 |
| Link1 DMA Load | 2 | Return Message for Message in Bucket 2 |
| Link1 DMA Store | 3 | Return Message for Message in Bucket 3 |

FIG. 5G shows an overview of the data fields in the two, terse, 64 bit words sent by the processor cores via the FMN/ISI to the DMA engine on the PCIe interface device, as well as an overview of the single, terse, 64 bit-word sent from the DMA engine on the PCIe interface device back to the processor cores via the FMN/ISI. As can be seen, most of the word space is taken up with DMA source address, DMA destination address, and memory data byte count information. The remainder of the two words consists of various control information bits and fields, as shown below:

The fields of the FMN/ISI message to the PCIe interface DMA engine are as follows

| Word | Field | Bits | Description |
| --- | --- | --- | --- |
| 0 | Reserved | 63:61 | |
| 0 | COHERENT | 60 | I/O Bus Slave request coherent enable |
| 0 | L2ALLOC | 59 | I/O Bus Slave request L2 Allocation enable |
| 0 | RDX | 58 | I/O Bus Slave request read exclusive enable |
| 0 | RETEN | 57 | Return message enable |
| 0 | RETID | 56:50 | Return message target ID |
| 0 | TID | 49:40 | Message tag ID |
| 0 | SRC | 39:0 | DMA source address |
| 1 | TD | 63 | PCIe request TD field |
| 1 | EP | 62 | PCIe request EP field |
| 1 | ATTR | 61:00 | PCIe request Attr field |
| 1 | BC | 59:40 | DMA data byte count |
| 1 | DEST | 39:0 | DMA destination address |

Here, the COHERENT, RDX, RETEN, TD, EP ATTR fields can be considered to be star topology serial bus control fields, or more specifically PCIe bus control fields.

The outgoing return message is essentially a glorified ACK or OK or problem message. It is composed of a single 64 bit word. Its fields are shown below:

| Field | Bits | Description |
| --- | --- | --- |
| Reserved | 63:14 | |
| FLUSH | 13 | Flush is enabled for the message |
| MSGERR | 12 | Incoming message error |
| IOBERR | 11 | I/O Bus error |
| PCIEERR | 10 | PCIe link error |
| TID | 9:0 | Message Tag ID |

To simplify this discussion, the progress of these return messages will not be discussed in detail, however some of this return path is shown indicated in FIG. 5F (555).

Returning to FIG. 5F, the incoming messages from the processor are stored in a message box (542) circuit, which can hold 4 buckets (different types) of messages with a buffer of 64 messages per type.

The messages are then processed through a round robin scheduler and a message bus arbiter to the DMA engine (541). Memory load (write) instructions are processed by the DMA load pasted requestor portion of the DMA engine (543), translated into appropriate PCIe-TCP data packets, and are then sent to the I/O bus slave circuit (545). This is then sent to the I/O bus arbiter circuit (546), which handles various PCI I/O bus requests using a round robin scheduler. The I/O bus arbiter then sends the packets to other PCIe circuitry, such as the I/O bus requestor (547) and the PCIe link completers (548). These work with the PCIe control arbiter (549) to manage the actual PCIe physical layer circuitry (550) that does the actual hardware PCIe packet sending and receiving. The PCIe-TCP packets then are put on the PCIe bus (551) and sent to the various PCIe devices (not shown). The write tag tracker tracks the status of reads out and content in. In this embodiment, all write commands do not expect responses and are complete once the commands are accepted, however all read and read exclusive commands expect return responses.

In this embodiment, in order to simplify the design, it is assumed that all I/O bus master read request completions can be returned out of order. In this embodiment, it is also assumed that all requests are for contiguous bytes, and that for the I/O, configuration, and register address spaces, the most number of byes requested in a command is 4 and the bytes do not cross the Double Word address boundary.

Figure 5H:
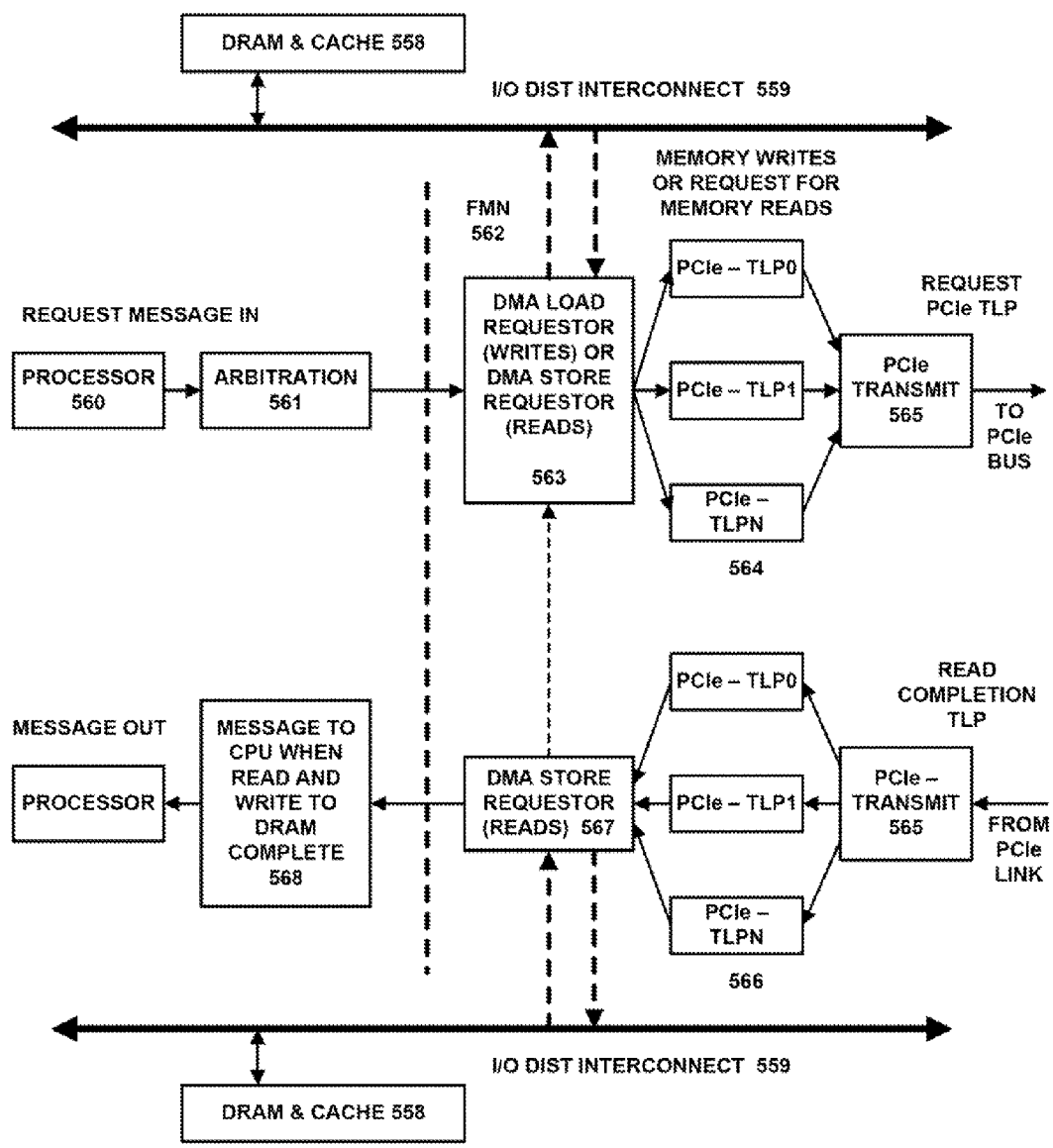
FIG. 5H shows how messages from the processor are translated by the PCIe interface DMA into PCIe TLP requests, and how these various PCIe TLP packets are reassembled by the PCIe interface DMA.

FIG. 5H shows an overview of the hardware flow of messages from the processor cores through the FMN to the PCIe interface device. The messages will typically originate from the processor cores (560) (previously shown in FIG. 5c (502C-0 to 502C-7), and be processed (561) for sending onto the FMN fast messaging network/interface switch Interconnect ISI (562) and then be received and processed by the initial stages of the PCIe interface (not shown). Eventually, after processing and appropriate round robin scheduling and arbitration, the write messages are sent to the DMA load requestor portion of the DMA engine (563). The DMA load requestor then reads to the DRAM or cache (558) via I/O interconnect (559), retrieves the appropriate data from DRAM or Cache (558), and then does the appropriate translation and calculations needed to translate the data and request from the original DMA request format (shown in 5G) to appropriate (usually multiple) PCI-TLP0, PCI-TLP1 . . . PCI-TLPn (564) requests needed to access the requested memory locations on the relevant PCIe device. These requests are then routed through the other PCIe circuits to the PCIe physical layer (565), where they are then transmitted on the PCIe bus.

As previously discussed, to simplify the system and make processing time faster, in this embodiment, the length of the write data plus the destination address double word offset cannot exceed the maximum pay load length of the PCIe-TLP. Further, the write request cannot cross 4K-byte address boundaries. The PCIe-TLPs are further divided into 32-byte source addresses Return PCIe-TLP data packets: Memory read (store) requests (again the two 64 bit words shown in FIG. 5G) also travel through the FMN to the PCIe interface, where they are passed to the DMA store requestor in the DMA engine. The maximum length of the read request depends on the configuration's maximum pay load size. When the source address of the DMA store message is not Double Word aligned, the length of the first return PCIe-TLP packets is 1, 2, or 3, (566). As before, in this embodiment, the read request PCIe-TLP packets cannot cross 4K byte source address boundaries.

The DMA store requestor return packet handler (567) will make the appropriate writes via the I/O (559) to cache or dram (558), consult the original DMA instructions, as well as the contents of the PCIe-TLP packets, and either generate additional PCIe-TLP packets to forward the data on to the appropriate PCIe device. It will then notify the processor cores (CPU) when read or write to the DRAM is complete.

The PCIe physical layer receiver receives (566) receives PCIe-TLP packets (567) from various PCIe devices. The DMA store requestor engine determines if the appropriate way to respond to the original DMA command is or is not to send out additional PCIe-TLP packets to other PCIe devices. If so, it sends appropriate PCIe-TMP commands out again. If the appropriate response to the received PCIe-TLP packets and the original DMA command is to write the data to L2 cache or place it back on the FMN/ISI bus, the DMA will again make the appropriate decision and route it to the FMN/ISI as needed.

Figure 5I:
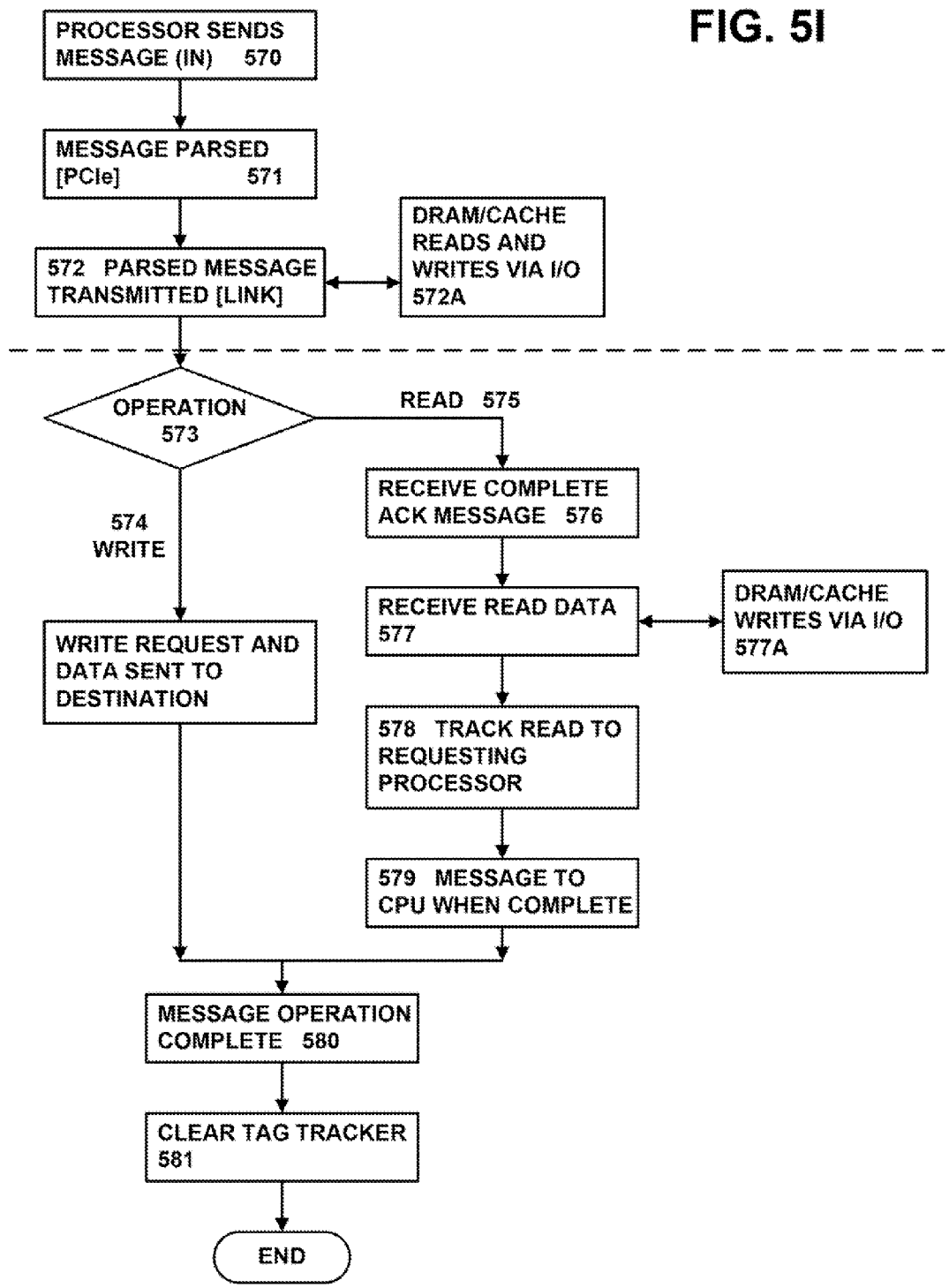
FIG. 5I shows allow chart showing the asymmetry in acknowledgement messages between PCIe read and write requests.

FIG. 5I shows a flow chart of how messages flow from the processor cores to the PCIe interface, and shows the asymmetry in return message generation between PCIe write and read requests. While write requests do not generate return confirmation messages, read messages do. After the processor (570) sends a PCIe message (571), this message is parsed by the PCIe interface (571) and sent to the DMA engine (572). The DMA engine makes the appropriate reads and writes to DRAM or Cache via the interconnect I/O (572A), and retrieves the needed data where it is retransmitted in the form of PCIe-TMP packets. If the requested operation (573) was a write (574), then the operation is completed silently. If the requested operation was a read (575), then the system generates a receive-complete acknowledgement (576), receives the read data (577), and again makes the appropriate DRAM or Cache writes via the interconnect I/O (577A), determines which processor or device requested the data (578), and places the data to the appropriate I/O interconnect (579) to return the data to the requesting device or processor. Once this is done (580), the PCIe will clear a tracking tag (581) that is monitoring the progress of the transaction, indicating completion.

Figure 6A:
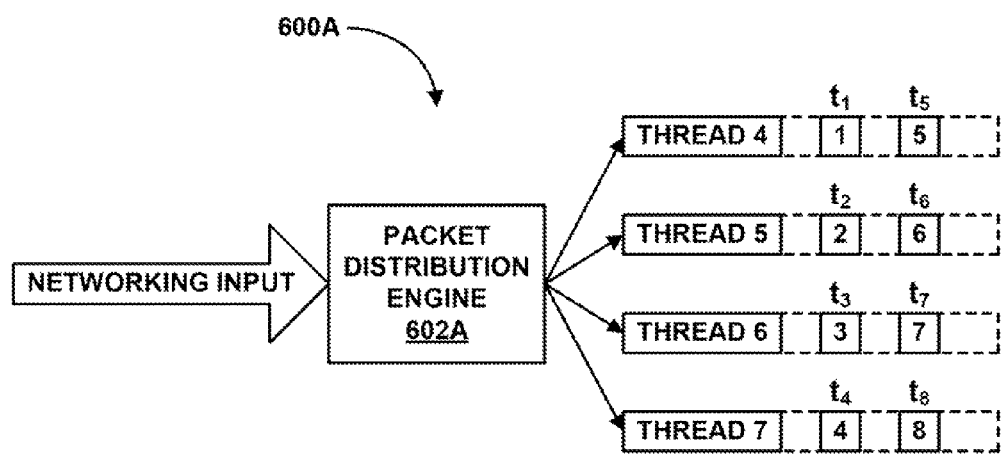
FIG. 6A illustrates a packet distribution engine (PDE) distributing packets evenly over four threads according to an embodiment of the invention.

Referring now to FIG. 6A, a PDE distributing packets evenly over four threads according to an embodiment of the invention is shown and indicated by the general reference character 600A. In this example, software may choose threads 4 through 7 for possible reception of packets. The PDE can then select one of these threads in sequence to distribute each packet, for example. In FIG. 6A, Networking Input can be received by Packet Distribution Engine (PDE) 602A, which can select one of Thread 4, 5, 6, or 7 for packet distribution. In this particular example, Thread 4 can receive packet 1 at time $t_i$ and packet 5 at time $t_5$, Thread 5 can receive packet 2 at time $t_2$ and packet 6 at time $t_6$, Thread 6 can receive packet 3 at time $t_3$ and packet 7 at time $t_7$, and Thread 7 can receive packet 4 at time $t_4$ and packet 8 at time $t_8$.

Figure 6B:
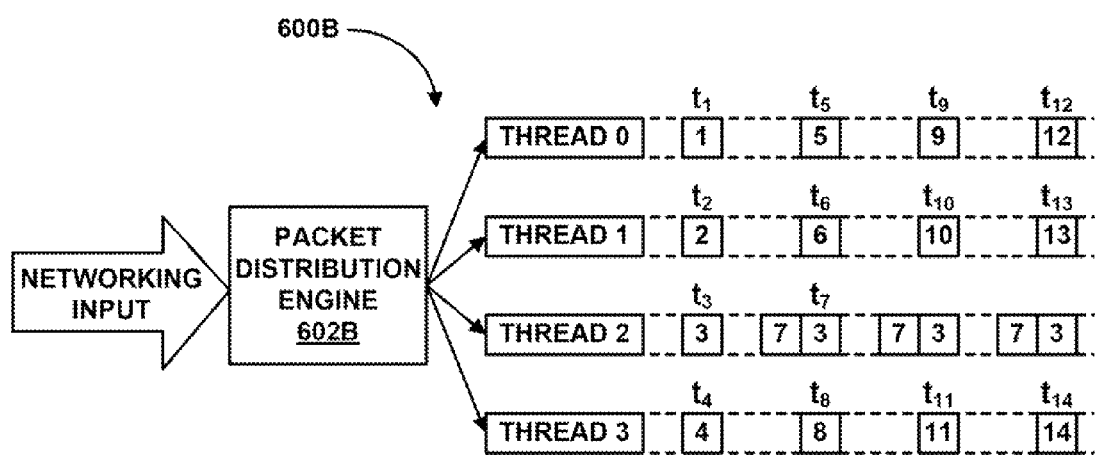
FIG. 6B illustrates a PDE distributing packets using a round-robin scheme according to an embodiment of the invention.

Referring now to FIG. 6B, a PDE distributing packets using a round-robin scheme according to an embodiment of the invention is shown and indicated by the general reference character 600B. As describe above with reference to the FMN, software can program the number of credits allowed for all receivers from every transmitter. Since the PDE is essentially a transmitter, it can also use the credit information to distribute the packets in a "round-robin" fashion. In FIG. 6B, PDE 602B can receive Networking Input and provide packets to the designated threads (e.g., Thread 0 through Thread 3), as shown. In this example, Thread 2 (e.g., a receiver) may be processing packets more slowly than the other threads, PDE 602B can detect the slow pace of credit availability from this receiver and adjust by guiding packets to the more efficiently processing threads. In particular, Thread 2 has the least number of credits available within the PDE at cycle $t_{11}$. Although the next logical receiver of packet 11 at cycle $t_{11}$ may have been Thread 2, the PDE can identify a processing delay in that thread and accordingly select Thread 3 as the optimal target for distribution of packet 11. In this particular example, Thread 2 can continue to exhibit processing delays relative to the other threads, so the PDE can avoid distribution to this thread. Also, in the event that none of the receivers has room to accept a new packet, the PDE can extend the packet queue to memory.

Because most networking applications are not very tolerant of the random arrival order of packets, it is desirable to deliver packets in order. In addition, it can be difficult to combine features of parallel processing and packet ordering in a system. One approach is to leave the ordering task to software, but it then becomes difficult to maintain line rate. Another option is to send all packets in a single flow to the same processing thread so that the ordering is essentially automatic. However, this approach would require flow identification (i.e., classification) prior to packet distribution and this reduces system performance. Another drawback is the throughput of the largest flow is determined by the performance of the single thread. This prevents single large flows from sustaining their throughput as they traverse the system.

Figure 6C:
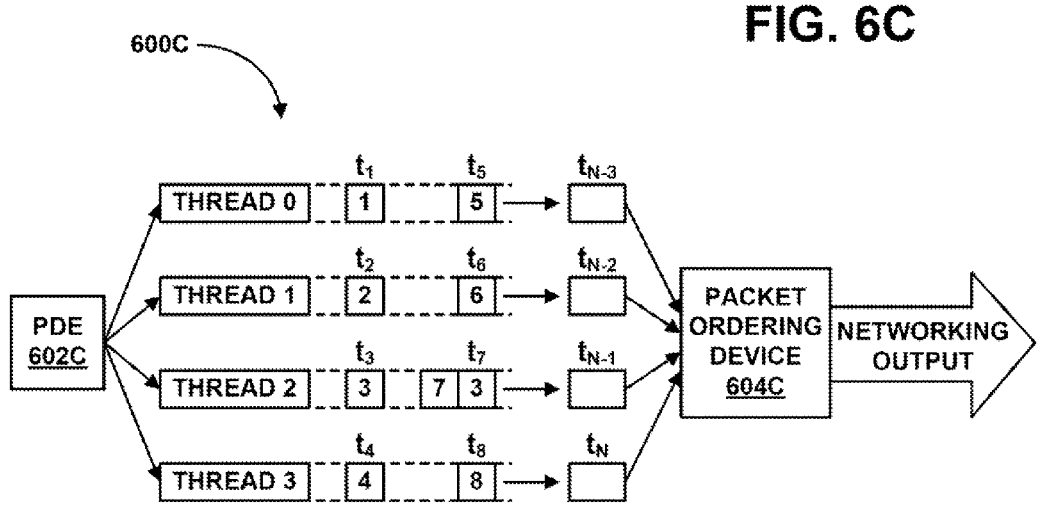
FIG. 6C illustrates a packet ordering device (POD) placement during packet lifecycle according to an embodiment of the invention.

According to an embodiment of the invention, an advanced hardware-accelerated structure called a Packet Ordering Device (POD) can be used. An objective of the POD is to provide an unrestricted use of parallel processing threads by re-ordering the packets before they are sent to the networking output interface. Referring now to FIG. 6C, a POD placement during packet lifecycle according to an embodiment of the invention is shown and indicated by the general reference character 600C. This figure essentially illustrates a logical placement of the POD during the life cycle of the packets through the processor. In this particular example, PDE 602C can send packets to the threads, as shown. Thread 0 can receive packet 1 at time $t_1$, packet 5 at time $t_5$, and so on through cycle $t_{n-3}$. Thread 1 can receive packet 2 at time $t_2$, packet 6 at time $t_6$, and so on through cycle $t_{n-2}$, Thread 2 can receive packet 3 at time $t_3$, packet 7 at time $t_7$, and so on through time $t_{n-1}$. Finally, Thread 3 can receive packet 4 at time $t_4$, packet 8 at time $t_8$, and so on through time $t_n$.

Packet Ordering Device (POD) 604C can be considered a packet sorter in receiving the packets from the different threads and then sending to Networking Output. All packets received by a given networking interface can be assigned a sequence number. This sequence number can then be forwarded to the working thread along with the rest of the packet information by the PDE. Once a thread has completed processing the packet, it can forward the packet descriptor along with the original sequence number to the POD. The POD can release these packets to the outbound interface in an order strictly determined by the original sequence numbers assigned by the receiving interface, for example.

Figure 6D:
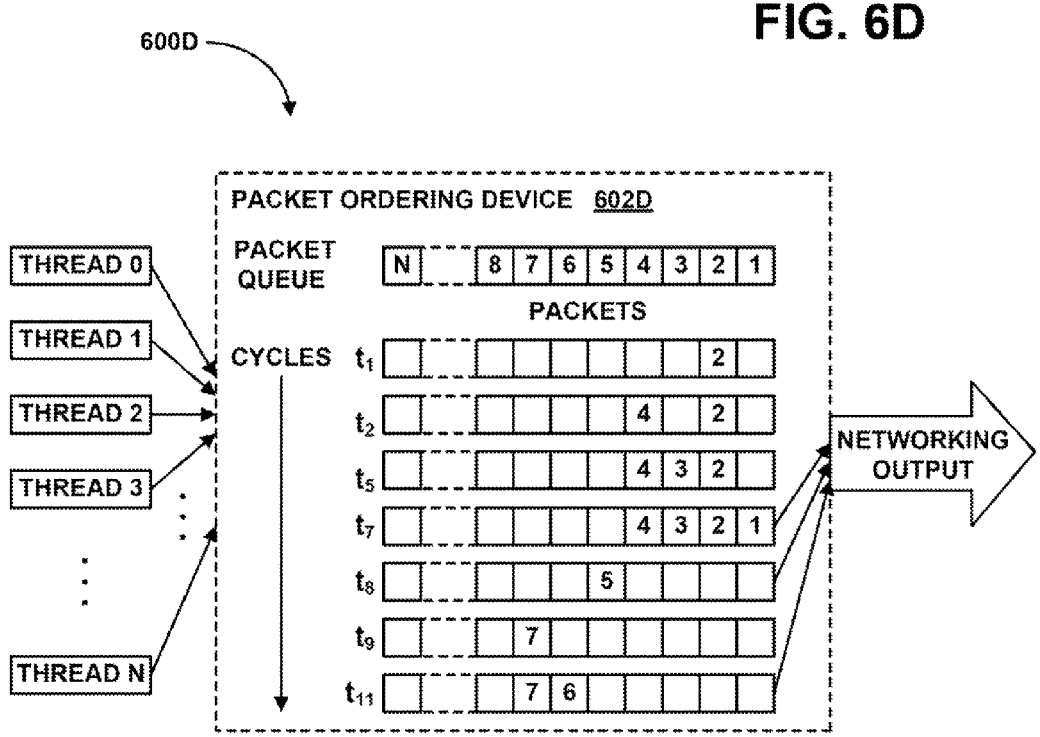
FIG. 6D illustrates a POD outbound distribution according to an embodiment of the invention.

In most applications, the POD will receive packets in a random order because the packets are typically processed by threads in a random order. The POD can establish a queue based on the sequence number assigned by the receiving interface and continue sorting packets as received. The POD can issue packets to a given outbound interface in the order assigned by the receiving interface. Referring now to FIG. 6D, a POD outbound distribution according to an embodiment of the invention is shown and indicated by the general reference character 600D. As can be seen in Packet Ordering Device (POD) 602D, packets 2 and 4 can be initially sent to the POD by executing threads. After several cycles, a thread can complete work on packet 3 and place it in the POD. The packets may not yet be ordered because packet 1 is not yet in place. Finally, packet 1 is completed in cycle $t_7$ and placed in the POD accordingly. Packets can now be ordered and the POD can begin issuing packets in the order: 1, 2, 3, 4. If packet 5 is received next, it is issued in the output following packet 4. As the remaining packets are received, each can be stored in the queue (e.g., a 512-deep structure) until the next higher number packet is received. At such time, the packet can be added to the outbound flow (e.g., Networking Output).

It is possible that the oldest packet may never arrive in the POD, thus creating a transient head-of-line blocking situation. If not handled properly, this error condition would cause the system to deadlock. However, according to an aspect of the embodiment, the POD is equipped with a time-out mechanism designed to drop a non-arriving packet at the head of the list once a time-out counter has expired. It is also possible that packets are input to the POD at a rate which fills the queue capacity (e.g., 512 positions) before the time-out counter has expired. According to an aspect of the embodiment, when the POD reaches queue capacity, the packet at the head of the list can be dropped and a new packet can be accepted. This action may also remove any head-of-line blocking situation as well. Also, software may be aware that a certain sequence number will not be entered into the POD due to a bad packet, a control packet, or some other suitable reason. In such a case, software control may insert a "dummy" descriptor in the POD to eliminate the transient head-of-line blocking condition before allowing the POD to automatically react.

According to embodiments of the invention, five programmable PODs may be available (e.g., on chip) and can be viewed as generic "sorting" structures. In one example configuration, software control (i.e., via a user) can assign four of the PODs to the four networking interfaces while retaining one POD for generic sorting purposes. Further, the PODs can simply be bypassed if so desired for applications where software-only control suffices.

F. Memory Interface and Access

In one aspect of embodiments of the invention, the advanced telecommunications processor can further include memory bridge 218 coupled to the data switch interconnect and at least one communication port (e.g., box 220), and configured to communicate with the data switch interconnect and the communication port.

In one aspect of the invention, the advanced telecommunications processor can further include super memory bridge 206 coupled to the data switch interconnect (DSI), the interface switch interconnect and at least one communication port (e.g., box 202, box 204), and configured to communicate with the data switch interconnect, the interface switch interconnect and the communication port.

In another aspect of embodiments of the invention, memory ordering can be implemented on a ring-based data movement network, as discussed above with reference to FIGS. 4A, 4B, and 4C.

G. Conclusion

Advantages of the invention include the ability to provide high bandwidth communications between computer systems and memory in an efficient and cost-effective manner. In particular, this embodiment of the invention focuses on a novel PCIe interface that enhances the capability of the advanced processor by enabling the processor to work with a variety of different PCIe devices.

Having disclosed exemplary embodiments and the best mode, modifications and variations may be made to the disclosed embodiments while remaining within the subject and spirit of the invention as defined by the following Claims.

The invention claimed is:

1. A system, comprising
   a multiple-core processor including a plurality of processor cores configured to support a plurality of software generated read or write instructions for interfacing with a star topology serial bus interface;
   a messaging network coupled to said plurality of processor cores and configured to link the processor cores together such that each processor core has a data pathway to each of the other processor cores without going through memory;
   a star topology serial bus interface operably coupled to said messaging network, said star topology serial bus interface comprising a direct memory access (DMA) device configured to translate memory read or write instructions from said messaging network into star topology serial bus transaction layer packets (TLP) in response to said read or write instructions, a message box circuit for storing incoming read or write instructions from said plurality of processor cores and assigned to at least one of a plurality of message types; and
   wherein said plurality of processor cores communicate with said star topology serial bus interface via short messages sent over said messaging network and assigned to at least one of the plurality of message types.

2. The system of claim 1, further comprising an interface switch interconnect coupled to said messaging network and said star topology serial bus interface, said interface switch interconnect configured to pass information among said messaging network and said star topology serial bus interface.

3. The system of claim 2, further comprising:
   a data switch interconnect, separate from said messaging network, said data switch interconnect configured to pass information among said purality of processor cores.

4. The system of claim 3, further comprising:
   a memory bridge coupled to the data switch interconnect and at least one communication port, and configured to communicate with said data switch interconnect and said at least one communication port.

5. The system of claim 1, further comprising a data switch interconnect, separate from said messaging network, said data switch interconnect configured to pass information among said plurality of processor cores.

6. The system of claim 5, wherein said data switch interconnect is configured to pass information among said plurality of processor cores without going through the messaging network.

7. The system of claim 6, wherein said messaging network is configured to link the processor cores together such that each processor core has a data pathway to each of the other processor cores without going through the data switch interconnect.

8. The system of claim 6, wherein each of said processor cores has a data cache and an instruction cache, and said messaging network is coupled to each of said processor cores by its respective instruction cache, and said data switch interconnect is coupled to each of said processor cores by its respective data cache.

9. The system of claim 5, further comprising:
   a level 2 cache coupled to the data switch interconnect and configured to store information accessible to said processor cores.

10. The system of claim 9 further comprising:
    a memory bridge coupled to the data switch interconnect and at least one communication port, and configured to communicate with said data switch interconnect and said at least one communication ports.

11. The system of claim 5, further comprising:
    a memory bridge coupled to the data switch interconnect and at least one communication port, and configured to communicate with said data switch interconnect and said at least one communication port.

12. The system of claim 1, wherein each of said processor cores has a data cache and an instruction cache, and said messaging network is coupled to each of said processor cores by its respective instruction cache.

13. A system, comprising:
- a multiple-core processor including a plurality of processor cores configured to support a plurality of software generated read or write instructions for interfacing with a PCIe bus via a PCIe serial bus interface;
- a messaging network coupled to said plurality of processor cores and configured to link the processor cores together such that each processor core has a data pathway to each of the other processor cores without going through memory, said messaging network; and
- the PCIe serial bus interface operably coupled to said messaging network, said PCIe serial bus interface comprising a direct memory access (DMA) device configured to translate memory read or write instructions from said messaging network into PCIe serial bus transaction layer packets (TLP) in response to said read or write instructions, a message box circuit for storing incoming read or write instructions from said plurality of processor cores and assigned to at least one of a plurality of message types; and
- wherein said plurality of processor cores communicate with said PCIe serial bus interface via short messages sent over said messaging network and assigned to at least one of the plurality of message types.

14. The system of claim 13, wherein the PCIe serial bus interface is integrated with the multiple-core processor.

15. A system, comprising:
- a multiple-core processor including a plurality of processor cores configured to support a plurality of software generated read or write instructions for interfacing with a star topology serial bus interface;
- a messaging network coupled to said plurality of processor cores and configured to link the processor cores together such that each processor core has a data pathway to each of the other processor cores without going through memory and further configured to be operably coupled to the star topology serial bus interface;
- an interface switch interconnect separate from said messaging network, said interface switch interconnect operably coupled to said messaging network and configured to pass information among the messaging network and a plurality of communication ports, including a star topology serial bus interface;
- a star topology serial bus interface operably coupled to said interface switch interconnect, said star topology serial bus interface comprising a direct memory access (DMA) device configured to translate memory read or write instructions from said messaging network into star topology serial bus transaction layer packets (TLP) in response to said read or write instructions, a message box circuit for storing incoming read or write instructions from said plurality of processor cores and assigned to at least one of a plurality of message types; and
- wherein said plurality of processor cores communicate with said star topology serial bus interface via short messages sent over said messaging network and assigned to at least one of the plurality of message types.

16. The system of claim 15 wherein said star topology serial bus interface is a PCIe serial bus interface.

17. The system of claim 16, wherein the PCIe serial bus interface handles the messages from at least one of said messaging network or said interface switch interconnect using internal queues.

18. The system of claim 16, wherein the PCIe serial bus interface handles the messages from at least one of said messaging network or said interface switch interconnect using a round-robin distribution scheme.

19. The system of claim 16, wherein the PCIe serial bus interface handles the messages from at least one of said messaging network or said interface switch interconnect using a weighted round-robin distribution scheme.

20. The system of claim 16, wherein the PCIe serial bus interface handles the messages from at least one of said messaging network or said interface switch interconnect using an eager round-robin distribution scheme.

21. The system of claim 16, wherein the PCIe serial bus interface utilizes a credit-based flow control system.

* * * * *